United States Patent
Zhong et al.

(10) Patent No.: US 12,278,768 B2
(45) Date of Patent: Apr. 15, 2025

(54) SERVICE PROCESSING METHOD AND APPARATUS, AND STORAGE MEDIUM

(71) Applicant: HUAWEI TECHNOLOGIES CO., LTD., Guangdong (CN)

(72) Inventors: Qiwen Zhong, Shenzhen (CN); Chunsheng Yang, Shenzhen (CN); Zhigang Zhu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 484 days.

(21) Appl. No.: 17/703,472

(22) Filed: Mar. 24, 2022

(65) Prior Publication Data

US 2022/0217091 A1 Jul. 7, 2022

Related U.S. Application Data

(63) Continuation of application No. PCT/CN2020/116610, filed on Sep. 21, 2020.

(30) Foreign Application Priority Data

Sep. 24, 2019 (CN) .......................... 201910906148.4

(51) Int. Cl.
*H04L 47/22* (2022.01)
*H04L 5/00* (2006.01)
(Continued)

(52) U.S. Cl.
CPC .......... *H04L 47/225* (2013.01); *H04L 5/0082* (2013.01); *H04L 5/22* (2013.01); *H04L 47/622* (2013.01); *H04L 47/72* (2013.01)

(58) Field of Classification Search
CPC .................................................... H04L 47/225
See application file for complete search history.

(56) References Cited

U.S. PATENT DOCUMENTS

| 7,664,139 B2 * | 2/2010 | Loprieno ................ H04J 3/076 370/476 |
| 12,047,983 B2 * | 7/2024 | Lu .......................... H04L 1/1887 |

(Continued)

FOREIGN PATENT DOCUMENTS

| CN | 101931884 A | 12/2010 |
| CN | 106506110 A | 3/2017 |

(Continued)

OTHER PUBLICATIONS

Extended European Search Report issued in European Application No. 20868968.7 on Sep. 5, 2022, 10 pages.

(Continued)

*Primary Examiner* — Guang W Li
(74) *Attorney, Agent, or Firm* — Fish & Richardson P.C.

(57) ABSTRACT

This application discloses example service processing methods and apparatuses. One example method includes obtaining a quantity of transmission windows corresponding to each of n services within a unit time period or in a unit data frame, wherein the unit time period or the unit data frame comprises m transmission windows, a total quantity of transmission windows corresponding to the n services is not greater than m, and both m and n are integers greater than 1. Corresponding transmission windows from the m transmission windows can then be allocated to each service based on the quantity of transmission windows corresponding to each of the n services. Based on the transmission windows corresponding to each service, service data of then services can then be multiplexed into multiplexed data transmitted in one channel. The multiplexed data can then be sent.

20 Claims, 9 Drawing Sheets

(51) Int. Cl.
*H04L 5/22* (2006.01)
*H04L 47/62* (2022.01)
*H04L 47/72* (2022.01)

(56) References Cited

U.S. PATENT DOCUMENTS

| | | | | |
|---|---|---|---|---|
| 2004/0095884 | A1* | 5/2004 | Lee | H04Q 11/0067 |
| | | | | 370/235 |
| 2014/0280398 | A1* | 9/2014 | Smith | H04L 69/326 |
| | | | | 707/825 |
| 2021/0091870 | A1* | 3/2021 | Zhang | H04J 3/1652 |
| 2021/0314929 | A1* | 10/2021 | Li | H04W 28/0268 |
| 2022/0217091 | A1* | 7/2022 | Zhong | H04L 5/22 |

FOREIGN PATENT DOCUMENTS

| | | |
|---|---|---|
| CN | 107566075 A | 1/2018 |
| CN | 109861781 A | 6/2019 |
| CN | 110266612 B | 1/2022 |
| EP | 3468075 A1 | 4/2019 |
| WO | 2019128934 A1 | 7/2019 |

OTHER PUBLICATIONS

PCT International Search Report and Written Opinion issued in International Application No. PCT/CN2020/116610 on Dec. 21, 2020, 15 pages (with English translation).

\* cited by examiner

SERVICE PROCESSING METHOD AND APPARATUS, AND STORAGE MEDIUM

CROSS-REFERENCE TO RELATED APPLICATIONS

This application is a continuation of International Application No. PCT/CN2020/116610, filed on Sep. 21, 2020, which claims priority to Chinese Patent Application No. 201910906148.4, filed on Sep. 24, 2019. The disclosures of the aforementioned applications are hereby incorporated by reference in their entireties.

TECHNICAL FIELD

This application relates to the field of communication technologies, and in particular, to a service processing method and apparatus, and a storage medium.

BACKGROUND

Currently, in both a flexible Ethernet (FlexE) and an optical transport network (OTN), bandwidth resources are managed in a slot division manner, and then service data is sent based on divided slots. For example, in the FlexE, a 100 G interface may be divided into 20 slots, and a bandwidth of each slot is 5 G. In this case, a corresponding slot may be allocated to each piece of to-be-transmitted service data based on a bandwidth required by the to-be-transmitted service data, and then the corresponding service data is transmitted by using the allocated slot. Service data of one service may correspond to a plurality of slots, but one slot may be used to carry service data of only one service.

However, because bandwidths of the slots divided in the FlexE and the OTN are large, for a small-granularity service whose required bandwidth is 10 M or 100 M, when the small-granularity service is carried by using the divided slots, a large waste of bandwidth resources is caused.

SUMMARY

This application provides a service processing method and apparatus, and a storage medium, which may be used to resolve a problem in a related technology that a waste of bandwidth resources occurs when a small-granularity service is carried by using divided slots. Technical solutions are as follows.

According to a first aspect, a service processing method is provided. The method includes: obtaining a quantity of transmission windows required by each of n to-be-mapped services within a unit time period or in a unit data frame, where the unit time period or the unit data frame includes m transmission windows, a total quantity of transmission windows required by the n services is not greater than m, and both m and n are integers greater than 1; allocating, from the m transmission windows, corresponding transmission windows to each service based on the quantity of transmission windows required by each of the n services; and multiplexing, based on the transmission windows corresponding to each service, service data of the n services into data transmitted in one channel, and sending the multiplexed data.

In this embodiment of this application, the unit time period or the unit data frame may be divided into the m transmission windows, and then the corresponding transmission windows are allocated to each service to transmit the service. In this way, a plurality of services may be multiplexed within one time period or in one data frame for service transmission, thereby avoiding a waste of bandwidth resources in a related technology that occurs because the one time period or the one data frame can carry only one service.

Optionally, an implementation process of the allocating, from the m transmission windows, corresponding transmission windows to each service based on the quantity of transmission windows required by each of the n services may be: determining, based on the quantity of transmission windows required by each of the n services, candidate service identifiers corresponding to each of k transmission resources, where the k transmission resources are obtained by dividing total transmission resources within the unit time period or in the unit data frame, the candidate service identifiers are service identifiers of services that expect to use the corresponding transmission resource, and k is not less than the largest quantity of transmission windows in quantities of transmission windows required by the n services; and allocating the corresponding transmission windows to each service based on the candidate service identifiers corresponding to each transmission resource.

In this application, the candidate service identifiers corresponding to each transmission resource may be determined, and the corresponding transmission windows are allocated to each service simultaneously based on the candidate service identifiers corresponding to each transmission resource.

Optionally, k is any value of the largest quantity of transmission windows, m, and $2^p$.

Optionally, an implementation process of the determining, based on the quantity of transmission windows required by each of the n services, candidate service identifiers corresponding to each of k transmission resources may be: sequentially detecting, based on the quantity of transmission windows required by each of the n services, whether each of the n services expects to use a first transmission resource, where the first transmission resource is any one of the k transmission resources; and if none of the n services expects to use the first transmission resource, determining that candidate service identifiers corresponding to the first transmission resource are empty; or if a service that expects to use the first transmission resource exists in the n services, using service identifiers of one or more services expecting to use the first transmission resource as candidate service identifiers of the first transmission resource.

Optionally, an implementation process of the allocating the corresponding transmission windows to each service based on the candidate service identifiers corresponding to each transmission resource may be: generating a service identifier buffer queue based on a sequence of the k transmission resources and a sequence of the services identified by the candidate service identifiers corresponding to each transmission resource; and when the total quantity of transmission windows required by the n services is equal to m, sequentially allocating, based on a sequence of the m transmission windows, the m transmission windows to the services identified by the service identifiers in the service identifier buffer queue; or when the total quantity of transmission windows required by the n services is less than m, sequentially allocating, based on a sequence of the m transmission windows, a quantity of transmission windows in the m transmission windows that is equal to the total quantity of transmission windows required by the n services to the services identified by the service identifiers in the service identifier buffer queue.

Optionally, when the total quantity of transmission windows required by the n services is equal to m, the n services include one or more idle services.

In other words, in this application, if a total quantity of transmission windows required by valid services is less than m, the one or more idle services may be constructed, a total quantity of constructed idle services and valid services is n, and the total quantity of transmission windows required by the n services is equal to m. In this way, when the n services are mapped to the m transmission windows, it can be ensured that the valid services in the n services can be evenly allocated to the transmission windows.

Optionally, the sequence of the services identified by the candidate service identifiers corresponding to each transmission resource is a sequence of service numbers of the services in ascending order; or the sequence of the services identified by the candidate service identifiers corresponding to each transmission resource is a sequence of remainders corresponding to the services in descending order, and a remainder corresponding to each service is a remainder obtained by dividing a product of the quantity of transmission windows required by the service and a sequence number of the corresponding transmission resource in the k transmission resources by k.

Optionally, an implementation process of the allocating the corresponding transmission windows to each service based on the candidate service identifiers corresponding to each transmission resource may be: when the candidate service identifiers corresponding to the first transmission resource are determined, generating a service identifier buffer queue based on the candidate service identifiers corresponding to the first transmission resource; and sequentially allocating, starting from the first transmission window in current remaining transmission windows of the m transmission windows, corresponding transmission windows to a service identified by each service identifier in the service identifier buffer queue, and deleting an allocated service identifier from the buffer queue; and correspondingly, when it is detected that the service identifier buffer queue is empty, using a second transmission resource as the first transmission resource, and re-performing a step of sequentially detecting, based on the quantity of transmission windows required by each of the n services, whether each of the n services expects to use a first transmission resource, where the second transmission resource is located after the first transmission resource and adjacent to the first transmission resource.

In this application, the service identifier buffer queue may be generated based on the candidate service identifiers corresponding to each transmission resource, and then the corresponding transmission windows are allocated to the candidate service identifiers in the service identifier buffer queue one by one. To shorten a length of the service identifier buffer queue, each time candidate service identifiers corresponding to one transmission resource are determined, one corresponding queue may be generated, and then transmission windows are allocated to the services identified by the service identifiers in the queue. After allocation is completed, candidate service identifiers corresponding to a next transmission resource are determined.

Optionally, an implementation process of the sequentially detecting, based on the quantity of transmission windows required by each of the n services, whether each of the n services expects to use a first transmission resource may be: for the $i^{th}$ service in the n services, determining a product of a quantity of transmission windows required by the $i^{th}$ service and j, where j is a sequence number of the first transmission resource in the k transmission resources; determining a remainder by dividing the product by k; and if the remainder is less than the quantity of transmission windows required by the $i^{th}$ service, determining that the $i^{th}$ service expects to use the first transmission resource.

Optionally, an implementation process of the sequentially detecting, based on the quantity of transmission windows required by each of the n services, whether each of the n services expects to use a first transmission resource may be: for the $i^{th}$ service in the n services, determining a product of a quantity of transmission windows required by the $i^{th}$ service and k−j+1, where j is a sequence number of the first transmission resource in the k transmission resources; determining a remainder by dividing the product by k; and if the remainder is less than the quantity of transmission windows required by the $i^{th}$ service, determining that the $i^{th}$ service expects to use the first transmission resource.

Optionally, an implementation process of the allocating, from the m transmission windows, corresponding transmission windows to each service based on the quantity of transmission windows required by each of the n services may be: allocating, from the m transmission windows, $C_1$ transmission windows to the first service in the n services based on a quantity $C_1$ of transmission windows required by the first service and m; and allocating, from remaining transmission windows in the m transmission windows, $C_i$ transmission windows to the $i^{th}$ service in the n services based on a quantity $C_i$ of transmission windows required by the $i^{th}$ service and m, where the remaining transmission windows are remaining transmission windows in the m transmission windows other than transmission windows allocated to the first i−1 services, and i is an integer greater than 1.

Optionally, an implementation process of allocating, from the m transmission windows, corresponding transmission windows to each service based on the quantity of transmission windows required by each of the n services may be: assigning i=1 and j=1, and determining, based on a quantity of transmission windows required by the $i^{th}$ service and m, whether the $i^{th}$ service expects to use the $h^{th}$ transmission window, where h is equal to j or h is equal to m −j+1; and if the $i^{th}$ service expects to use the $h^{th}$ transmission window, allocating the $h^{th}$ transmission window to the $i^{th}$ service; and assigning i=1 and j=j+1, and returning to a step of determining whether the $i^{th}$ service expects to use the $h^{th}$ transmission window until j=m; or if the $i^{th}$ service does not expect to use the $h^{th}$ transmission window, assigning i=i+1, returning to a step of determining whether the $i^{th}$ service expects to use the $h^{th}$ transmission window until i=n, and allocating the $h^{th}$ transmission window to the $n^{th}$ service; and assigning i=1 and j=j+1, and returning to the step of determining whether the $i^{th}$ service expects to use the $h^{th}$ transmission window.

In this application, the transmission windows are allocated to each service simultaneously by using the foregoing method. In addition, the transmission windows may alternatively be allocated to each service sequentially by using the foregoing method.

Optionally, the method further includes: sending service configuration parameters to a receiving device, so that the receiving device demultiplexes the received multiplexed data based on the service configuration parameters to obtain the service data of the n services, where the service configuration parameters include the quantity of transmission windows required by each of the n services.

In this application, before or when sending the multiplexed data to the receiving device, a sending device may further send the service configuration parameters to the receiving device. Therefore, the receiving device may determine, based on the service configuration parameters, the transmission windows corresponding to each service by using a same method as that of the sending device, in other words, determine the transmission windows by which each service is carried. In this way, the receiving device may demultiplex the received services based on the determined transmission windows corresponding to each service, to restore each service. In this way, a mapping relationship between a service and transmission windows does not need to be stored in the sending device, and the mapping relationship between the service and the transmission windows does not need to be transmitted between the sending device and the receiving device. Correct demultiplexing of the service can be implemented by transmitting only a small quantity of service configuration parameters, which has high storage efficiency and transmission efficiency.

According to a second aspect, a service processing apparatus is provided. The service processing apparatus has a function of implementing behavior of the service processing method in the first aspect. The service processing apparatus includes at least one module, and the at least one module is configured to implement the service processing method provided in the first aspect.

According to a third aspect, a service processing apparatus is provided. The service processing apparatus includes a processor and a memory, and the memory is configured to: store a program that supports the service processing apparatus to perform the service processing method provided in the first aspect, and store data used to implement the service processing method provided in the first aspect. The processor is configured to execute the program stored in the memory. The service processing apparatus may further include a communication bus, and the communication bus is configured to establish a connection between the processor and the memory.

According to a fourth aspect, a computer-readable storage medium is provided. The computer-readable storage medium stores instructions, and when the instructions are run on a computer, the computer is enabled to perform the service processing method according to the first aspect.

According to a fifth aspect, a computer program product including instructions is provided. When the instructions are run on a computer, the computer is enabled to perform the service processing method according to the first aspect.

Technical effects achieved in the second aspect, the third aspect, the fourth aspect, and the fifth aspect are similar to technical effects achieved by using corresponding technical means in the first aspect. Details are not described herein.

Beneficial effects brought by the technical solutions provided in this application include at least the following:

In this embodiment of this application, a transmit end may obtain the quantity of transmission windows required by each of the n to-be-mapped services within the unit time period or in the unit data frame, where the unit time period or the unit data frame includes the m transmission windows. Then, the transmit end may allocate, from the m transmission windows, the corresponding transmission windows to each service based on the quantity of transmission windows required by each service; and multiplex, based on the transmission windows corresponding to each service, the service data of the n services into the data transmitted in one channel, and send the multiplexed data. It can be learned that in the embodiments of this application, the unit time period or the unit data frame may be divided into the m transmission windows, and then the corresponding transmission windows are allocated to each service to transmit the service. In this way, the plurality of services may be multiplexed within one time period or in one data frame for service transmission, thereby avoiding the waste of the bandwidth resources in the related technology that occurs because the one time period or the one data frame can carry only one service.

DESCRIPTION OF EMBODIMENTS

To make the objectives, technical solutions, and advantages of this application clearer, the following further describes embodiments of this application in detail with reference to the accompanying drawings.

Before the embodiments of this application are described in detail, a system architecture involved in the embodiments of this application is first described.

Figure 1:
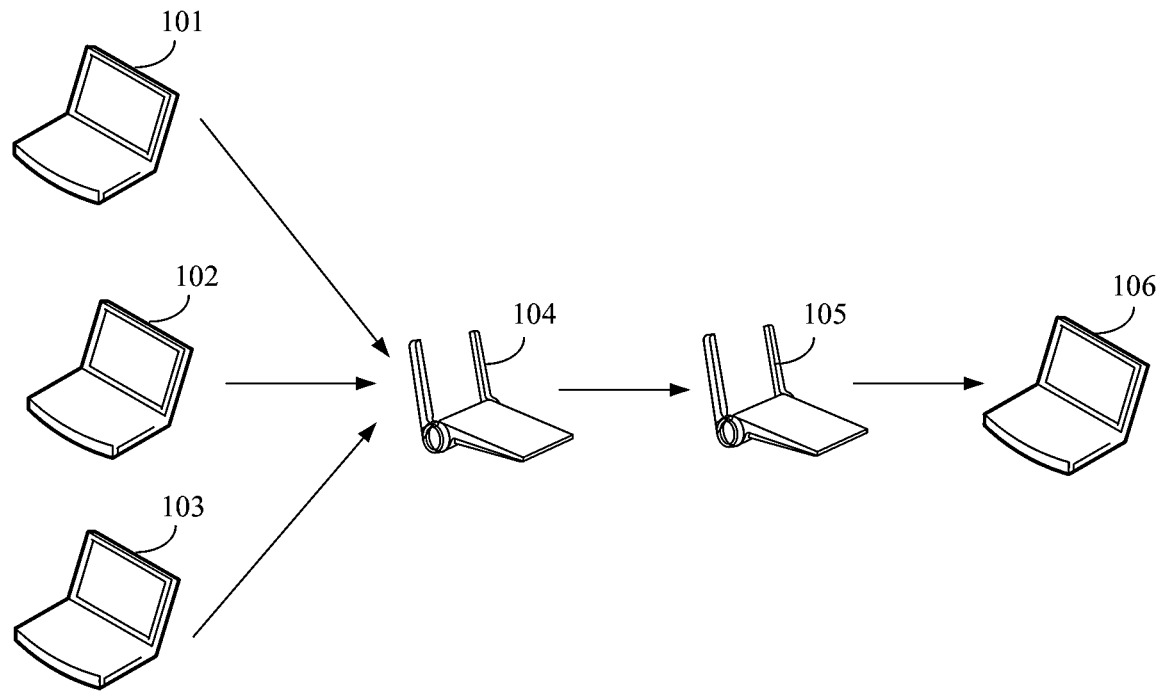
FIG. 1 is a diagram of a system architecture involved in a service processing method according to an embodiment of this application.

FIG. 1 is a diagram of a system architecture involved in a service processing method according to an embodiment of this application. As shown in FIG. 1, a system includes user equipments 101 to 103, a forwarding device 104, a forwarding device 105, and user equipment 106.

The user equipments 101 to 103 may send service data to the forwarding device 104. After receiving the service data sent by the user equipments 101 to 103, the forwarding device 104 may allocate a plurality of transmission windows in a specified slot to a plurality of different services by using the service processing method provided in the embodiments of this application, and send, in the allocated transmission windows, the received service data to the forwarding device 105. In other words, the plurality of services may be multiplexed within one slot to transmit the service data. It should be noted that, in this embodiment of this application, the forwarding device 104 may further send, to the forwarding device 105, a quantity of transmission windows included in the specified slot and a quantity of transmission windows required by each of the plurality of services transmitted in the specified slot.

The forwarding device 105 may determine, based on the quantity of transmission windows in the specified slot and the quantity of transmission windows required by each of the plurality of services transmitted in the specified slot that are sent by the forwarding device 104, transmission windows corresponding to each service by using the service processing method provided in the embodiments of this application. In other words, a service to which service data carried in each transmission window belongs is determined, and the received service data is demultiplexed. Then, the forwarding device 105 may forward demultiplexed service data to the user equipment 106.

The user equipments 101 to 103 and the user equipment 106 each may be a personal computer, a desktop computer, a server, or the like. The forwarding devices 104 and 105 each may be a network device having an Ethernet interface, a FlexE interface, or an OTN interface, for example, a core router, an edge router, an OTN transmission device, an Internet protocol radio access network (IP RAN) box-shaped or frame-shaped transmission device, or a packet transport network (PTN) box-shaped or frame-shaped transmission device.

It may be understood that FIG. 1 is merely an example of a diagram of an architecture. In actual application, in addition to the user equipments 101 to 103 and the user equipment 106 shown in FIG. 1, the system may include a plurality of other user equipments. Certainly, in addition to the forwarding devices 104 and 105, the system may further include a plurality of forwarding devices. A quantity of devices is not limited in this embodiment of this application.

Figure 2:
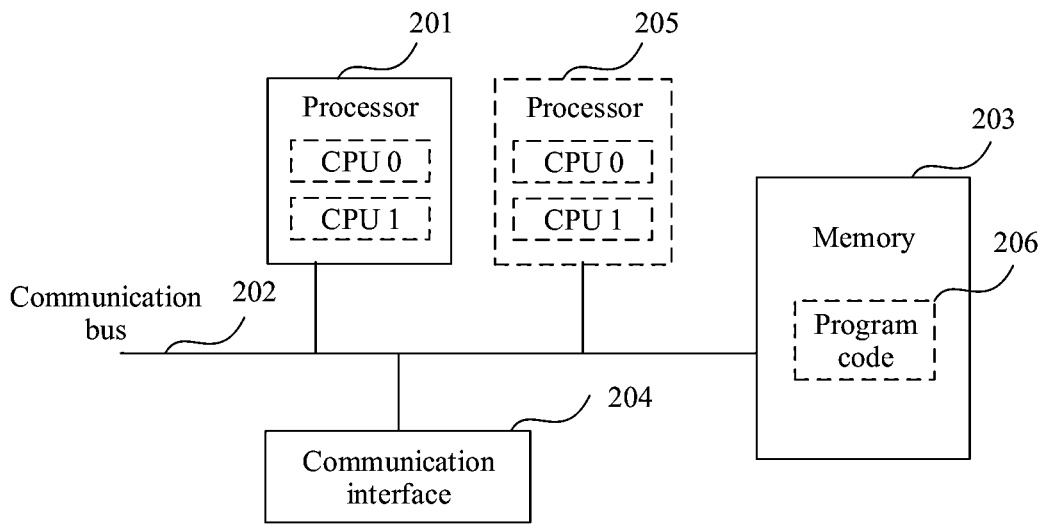
FIG. 2 is a schematic diagram of a structure of a network device according to an embodiment of this application.

FIG. 2 is a schematic diagram of a structure of a network device according to an embodiment of this application. The forwarding device in FIG. 1 may be implemented by using the network device shown in FIG. 2. Refer to FIG. 2. The network device includes at least one processor 201, a communication bus 202, a memory 203, and at least one communication interface 204.

The processor 201 may be a general-purpose central processing unit (CPU), a microprocessor, an application-specific integrated circuit (ASIC), or one or more integrated circuits configured to control program execution in the solutions of this application.

The communication bus 202 may include a path for transmitting information between the foregoing components.

The memory 203 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blue-ray optical disc, or the like), a magnetic disk storage medium or another magnetic storage device, or any other medium capable of carrying or storing expected program code in a form of an instruction or a data structure and capable of being accessed by a computer. This is not limited thereto. The memory 203 may exist independently, and be connected to the processor 201 through the communication bus 202. The memory 203 may alternatively be integrated with the processor 201.

The communication interface 204 may be any apparatus like a transceiver to communicate with another device or a communication network, for example, the Ethernet, a radio access network (RAN), or a wireless local area network (WLAN).

During specific implementation, in an embodiment, the processor 201 may include one or more CPUs such as a CPU 0 and a CPU 1 shown in FIG. 2.

During specific implementation, in an embodiment, the computer device may include a plurality of processors such as the processor 201 and a processor 205 shown in FIG. 2. Each of these processors may be a single-core (single-CPU) processor, or may be a multi-core (multi-CPU) processor. The processor herein may be one or more devices, circuits, and/or processing cores configured to process data (for example, computer program instructions).

The memory 203 is configured to store program code that is used to execute the solutions of this application, and execution is controlled by the processor 201. The processor 201 is configured to execute program code 206 stored in the memory 203. The program code 206 may include one or more software modules. The forwarding device shown in FIG. 1 may process a to-be-transmitted service or a received service by using the processor 201 and the one or more software modules in the program code 206 in the memory 203.

The following describes in detail the service processing method provided in the embodiments of this application.

Figure 3:
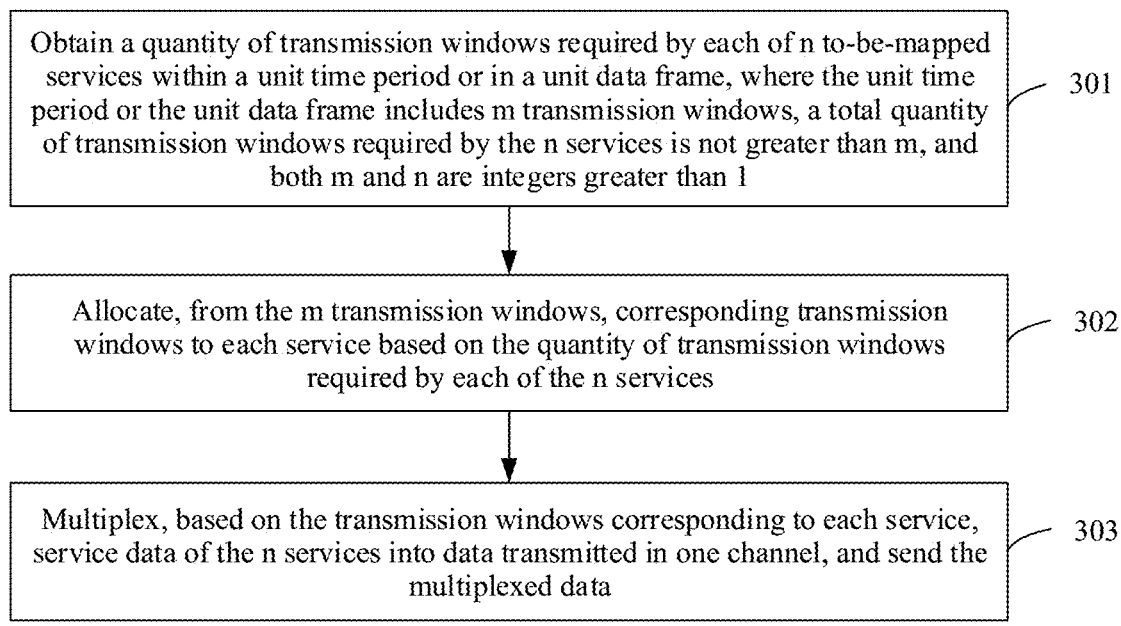
FIG. 3 is a flowchart of a service processing method according to an embodiment of this application.

FIG. 3 is a flowchart of a service processing method according to an embodiment of this application. The service processing method may be applied to the forwarding device 104 shown in FIG. 1 for service data sending. Refer to FIG. 3. The method includes the following steps:

Step 301: Obtain a quantity of transmission windows required by each of n to-be-mapped services within a unit time period or in a unit data frame, where the unit time period or the unit data frame includes m transmission windows, a total quantity of transmission windows required by the n services is not greater than m, and both m and n are integers greater than 1.

Currently, a FlexE includes FlexE interfaces with a plurality of bandwidths such as 50 G, 100 G, 200 G, and 400 G. A FlexE interface may be divided into a plurality of slots. For example, a 50 G FlexE interface may include 10 slots, and a bandwidth of each slot is 5 G. For another example, a 100 G FlexE interface may include 20 slots, and a bandwidth of each slot is 5 G. Similarly, an OTN also includes OTN interfaces with a plurality of bandwidths, and an OTN interface may also be divided into a plurality of slots. For example, a 100 G OTN interface may be divided into 40 slots, and a bandwidth of each slot is 2.5 G; or a 100 G OTN interface may be divided into 80 slots, and a bandwidth of each slot is 1.25 G.

In this embodiment of this application, one slot of the interfaces may be used as one unit time period, and the slot is divided to obtain m transmission windows. The slot may be divided based on a specified bit length, to obtain the m transmission windows. For example, in the FlexE, one FlexE interface may support one or more FlexE instances, and each FlexE instance introduces a fixed periodic frame structure. For the 100 G FlexE interface, when the 100 G FlexE interface supports one FlexE instance, one fixed periodic frame structure may be divided into 20 slots, and each slot includes 1023×8 66-bit code blocks. Based on this, one 66-bit code block may be used as one transmission window. In this way, one slot may be divided into 1023×8 transmission windows. For another example, a periodic frame structure is also introduced in the OTN, and slot division is performed based on the periodic frame structure. Based on this, the slot may be divided based on a specified byte length, to obtain the m transmission windows. For example, one byte is used as one transmission window, or four bytes are used as one transmission window.

It can be learned from the foregoing description that a bandwidth of each of the m transmission windows included in one slot is fixed. Based on this, a forwarding device may determine, based on a bandwidth required by each of the n to-be-transmitted services and the bandwidth of each transmission window, the quantity of transmission windows required by each service. A total bandwidth required by the n services is less than a bandwidth of one slot. Correspondingly, the quantity of transmission windows required by the n services is less than or equal to a quantity m of transmission windows included in the slot.

For example, it is assumed that a bandwidth of a transmission window is x, and a bandwidth required by a to-be-transmitted service is y. Therefore, the forwarding device may calculate a ratio of y to x, and round up the calculated ratio, to obtain a quantity of transmission windows required by the service.

Optionally, in a possible case, the forwarding device may also divide the unit data frame, to obtain a plurality of transmission windows. For example, for one Ethernet frame, the forwarding device may use the Ethernet frame as one unit data frame, and divide the Ethernet frame based on a specified length, to obtain the m transmission windows.

Step 302: Allocate, from the m transmission windows, corresponding transmission windows to each service based on the quantity of transmission windows required by each of the n services.

First implementation: The forwarding device may determine, based on the quantity of transmission windows required by each service, candidate service identifiers corresponding to each of k transmission resources, where the k transmission resources are obtained by dividing total transmission resources within the unit time period or in the unit data frame, the candidate service identifiers are service identifiers of services that expect to use the corresponding transmission resource, and k is not less than the largest quantity of transmission windows in quantities of transmission windows required by the n services; and allocate the corresponding transmission windows to each service based on the candidate service identifiers corresponding to each transmission resource.

The total transmission resources within the unit time period or in the unit data frame may be divided based on a size of the transmission window. In this way, a total quantity of transmission resources obtained by dividing is equal to m, in other words, k is equal to m. Certainly, the total transmission resources within the unit time period or in the unit data frame may also be divided at a granularity greater than the transmission window. In this case, k is less than m. When division is performed based on a bandwidth of a service corresponding to the largest quantity of transmission windows in the quantities of transmission windows required by the n services, k is equal to the largest quantity of transmission windows. Alternatively, the total transmission resources within the unit time period or in the unit data frame may be divided at a granularity smaller than the transmission window. In this case, k is greater than m. In other words, in this embodiment of this application, k is not less than the largest quantity of transmission windows. k may be equal to any value of the largest quantity of transmission windows, m, and $2^p$.

It should be noted that, in this implementation, the forwarding device may allocate the corresponding transmission windows to each service by using the following several different methods.

(1) The forwarding device may sequentially detect, based on the quantity of transmission windows required by each service, whether each of the n services expects to use a first transmission resource, where the first transmission resource is any one of the k transmission resources; and if none of the n services expects to use the first transmission resource, determine that candidate service identifiers corresponding to the first transmission resource are empty; or if a service that expects to use the first transmission resource exists in the n services, use service identifiers of one or more services expecting to use the first transmission resource as candidate service identifiers of the first transmission resource. Then, the forwarding device may generate a service identifier buffer queue based on a sequence of the k transmission resources and a sequence of the services identified by the candidate service identifiers corresponding to each transmission resource; and when the total quantity of transmission windows required by the n services is equal to m, sequentially allocate, based on a sequence of the m transmission windows, the m transmission windows to the services identified by the service identifiers in the service identifier buffer queue; or when the total quantity of transmission windows required by the n services is less than m, sequentially allocate, based on a sequence of the m transmission windows, a quantity of transmission windows in the m transmission windows that is equal to the total quantity of transmission windows required by the n services to the services identified by the service identifiers in the service identifier buffer queue.

The services may be arranged in descending order based on the quantity of transmission windows required by each service, or may be arranged based on urgency of the services. This is not limited in this embodiment of this application. In addition, the forwarding device may sort the k transmission resources based on the sequence of the k transmission resources, and sequentially number the k transmission resources. A sequence number of the $1^{st}$ transmission resource is 1, and a sequence number of the second transmission resource is 2. The rest may be deduced by analogy.

On this basis, the forwarding device may sequentially detect, starting from the $1^{st}$ transmission resource in the k transmission resources, whether the first service, the second service, . . . , and the $n^{th}$ service expect to use the $1^{st}$ transmission resource; and use service identifiers of services that expect to use the $1^{st}$ transmission resource as candidate service identifiers of the $1^{st}$ transmission resource. Then, the forwarding device may sequentially detect whether the first service, the second service, . . . , and the $n^{th}$ service expects to use the second transmission resource in the k transmission resources. The rest may be deduced by analogy.

For example, the $j^{th}$ transmission resource in the k transmission resources, namely, the first transmission resource, is used as an example, and the $i^{th}$ service in the n services is used as an example. When detecting whether a service expects to use a transmission resource, the forwarding device may detect, in the following two manners, whether the $i^{th}$ service expects to use the first transmission resource.

In a first manner, the forwarding device may determine a product of a quantity of transmission windows required by the $i^{th}$ service and j, where j is a sequence number of the first transmission resource in the k transmission resources; determine a remainder by dividing the product by k; and if the remainder is less than the quantity of transmission windows required by the $i^{th}$ service, determine that the $i^{th}$ service expects to use the first transmission resource; or if the remainder is greater than the quantity of transmission windows required by the $i^{th}$ service, determine that the $i^{th}$ service does not expect to use the first transmission resource.

Figure 4:
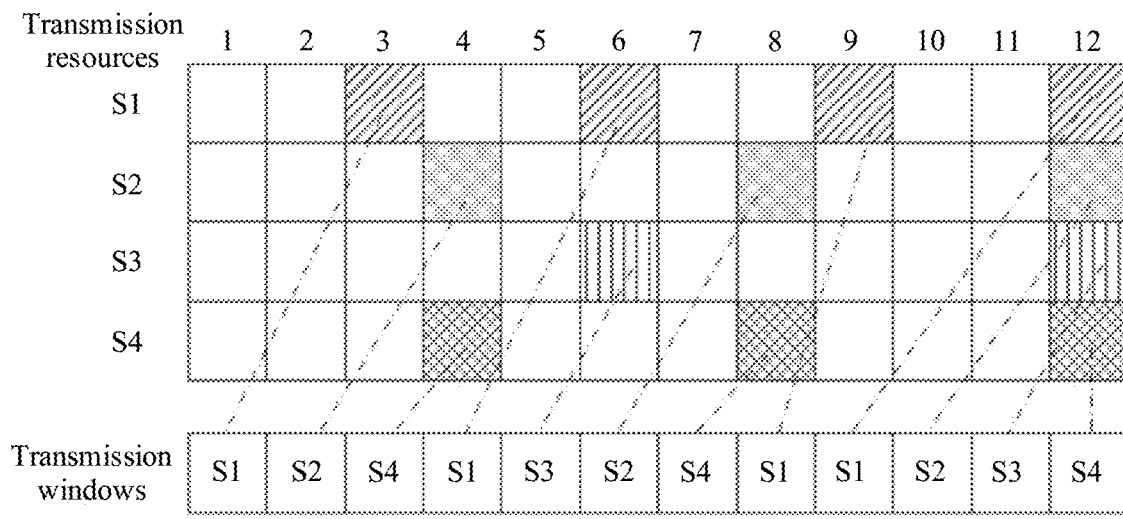
FIG. 4 is a schematic diagram of allocating transmission windows to each service according to an embodiment of this application.

For example, refer to FIG. 4. It is assumed that there are currently four services, and service identifiers corresponding to the four services are S1, S2, S3, and S4, where a quantity of transmission windows required by S1 is 4, a quantity of transmission windows required by S2 is 3, a quantity of transmission windows required by S3 is 2, and a quantity of transmission windows required by S4 is 3. The four services are arranged in a sequence of S1, S2, S3, and S4. It is assumed that k is equal to 12, in other words, there are 12 transmission resources. In this case, the forwarding device may first multiply the quantity of transmission windows required by S1 and 1 to obtain a product, namely, 4; and divide the product by k to obtain a remainder, namely, 4. Because the remainder is not less than the quantity of transmission windows required by S1, it can be learned that S1 does not expect to use the $1^{st}$ transmission resource. Then, the forwarding device detects, by using the same method, whether the second service expects to use the $1^{st}$ transmission resource. The rest may be deduced by analogy. It may be determined, by using the foregoing method, that all the services do not expect to use the $1^{st}$ transmission resource. In this case, the forwarding device may determine that the candidate service identifiers corresponding to the $1^{st}$ transmission resource are empty. After determining the candidate service identifiers corresponding to the $1^{st}$ transmission resource, the forwarding device may sequentially detect, with reference to the foregoing method, whether each service expects to use the second transmission resource. It may be learned, by using the foregoing method, that a remainder corresponding to each service is not less than the quantity of transmission windows required by the service. Therefore, it may be determined that candidate service identifiers corresponding to the second transmission resource are also empty. For the third transmission resource, it is determined, by using the foregoing method, that a remainder corresponding to the service S1 is 0, which is less than the quantity of transmission windows required by S1, and remainders corresponding to other services are all greater than quantities of transmission windows required by the services. Therefore, it can be learned that S1 expects to use the third transmission resource, and the other services do not expect to use the third transmission resource. In this case, it may be determined that a candidate service identifier corresponding to the third transmission resource is S1. Similarly, it may be determined, by using the foregoing method, that candidate service identifiers corresponding to the fourth and the eighth transmission resources both are S2 and S4, candidate service identifiers corresponding to the fifth, the seventh, the tenth, and the eleventh transmission resources are empty, candidate service identifiers corresponding to the sixth transmission resource are S1 and S3, a candidate service identifier corresponding to the ninth transmission resource is S1, and candidate service identifiers corresponding to the twelfth transmission resource are S1, S2, S3, and S4.

After determining the candidate service identifiers corresponding to each transmission resource, the forwarding device may generate the service identifier buffer queue based on the sequence of the k transmission resources and the sequence of the services identified by the candidate service identifiers.

After determining the candidate service identifiers corresponding to each transmission resource, the forwarding device may arrange the candidate service identifiers corresponding to each transmission resource based on the sequence of the transmission resources, to obtain the service identifier buffer queue.

It should be noted that, for candidate service identifiers corresponding to one transmission resource, the forwarding device may arrange the service identifiers in ascending order based on service numbers of services identified by the service identifiers. Alternatively, the service identifiers may be arranged in descending order of remainders corresponding to the services identified by the service identifiers. A remainder corresponding to each service is a remainder obtained by dividing a product of a quantity of transmission windows required by the service and a sequence number of the corresponding transmission resource in the k transmission resources by k.

Optionally, in this embodiment of this application, after determining that candidate service identifiers corresponding to one transmission resource are obtained each time, the forwarding device may add the candidate service identifiers to the service identifier buffer queue based on a sequence of corresponding services. In other words, after determining the candidate service identifiers corresponding to the $1^{st}$ transmission resource, the forwarding device may form an initial service identifier buffer queue based on a sequence of services corresponding to the candidate service identifiers. Then, after determining the candidate service identifiers corresponding to the second transmission resource, starting from the tail of the initial service identifier buffer queue, the forwarding device sequentially adds, based on a sequence of services corresponding to the candidate service identifiers, the candidate service identifiers corresponding to the second transmission resource to the service identifier buffer queue. This process is repeated until candidate service identifiers corresponding to the $k^{th}$ transmission resource are added to the service identifier buffer queue.

It should be noted that, when the foregoing method is used to determine the candidate service identifiers corresponding to each transmission resource, there may be a case in which none of the several transmission resources has corresponding candidate service identifiers, in other words, no service expects to use the several transmission resources. In this case, to reduce a delay, the forwarding device may need to determine candidate service identifiers corresponding to all the transmission resources in advance of one slot or earlier, to ensure that each transmission window can be allocated starting from the first transmission window in the slot.

Figure 5:
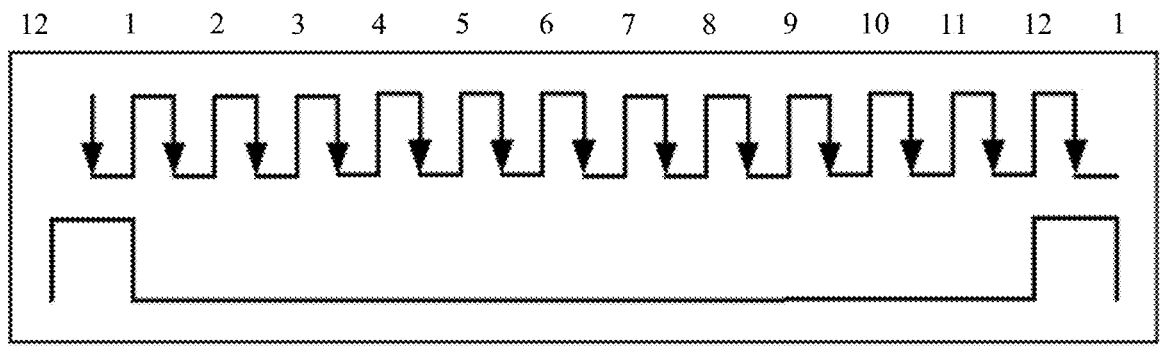
FIG. 5 is a schematic diagram of a trigger signal for determining candidate service identifiers corresponding to the $j^{th}$ transmission resource according to an embodiment of this application.
Figure 6:
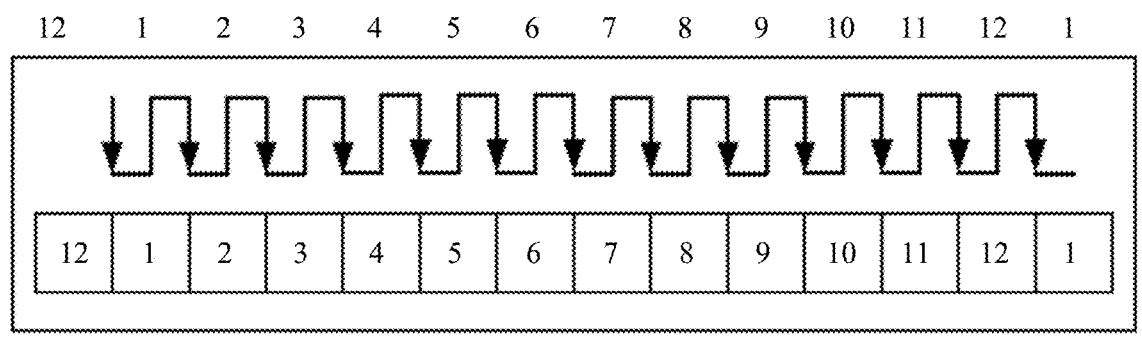
FIG. 6 is another schematic diagram of a trigger signal for determining candidate service identifiers corresponding to the $j^{th}$ transmission resource according to an embodiment of this application.

In addition, it should be noted that, when the first manner is used to sequentially detect whether each service expects to use the transmission resources, for the $j^{th}$ transmission resource in the k transmission resources, refer to FIG. 5. The forwarding device may trigger, by using a clock pulse signal whose number is j, an operation of determining candidate service identifiers corresponding to the $i^{th}$ transmission resource. Optionally, refer to FIG. 6. The forwarding device may alternatively trigger the operation by using a value j and the corresponding clock pulse signal. This is not limited in this embodiment of this application.

In a second manner, the forwarding device may determine a product of a quantity of transmission windows required by the $i^{th}$ service and $k-j+1$, where j is a sequence number of the first transmission resource in the k transmission resources; determine a remainder by dividing the product by k; and if the remainder is less than the quantity of transmission windows required by the $i^{th}$ service, determine that the $i^{th}$ service expects to use the first transmission resource; or if the remainder is not less than the quantity of transmission windows required by the $i^{th}$ service, determine that the $i^{th}$ service does not expect to use the first transmission resource.

Figure 7:
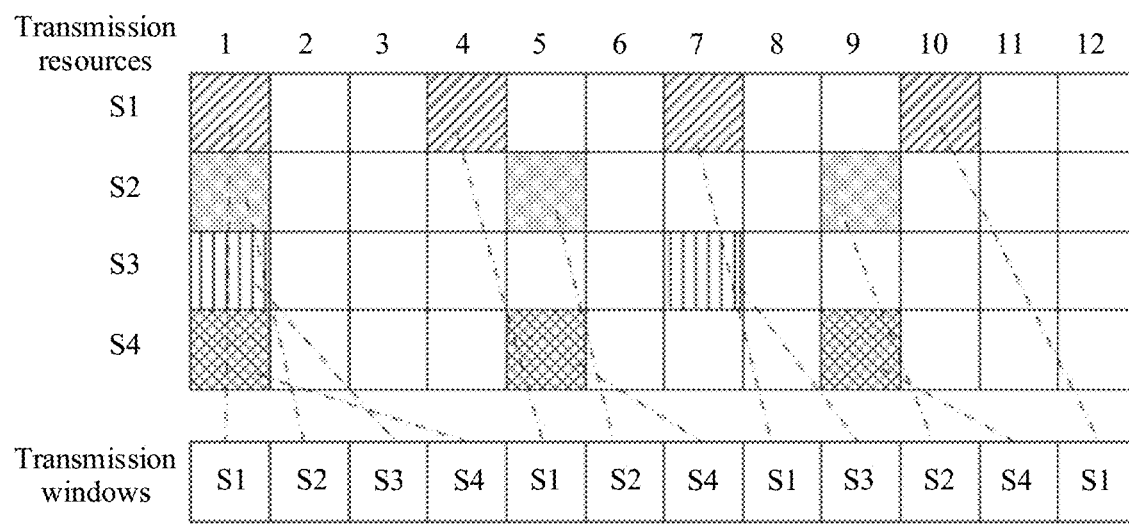
FIG. 7 is another schematic diagram of allocating transmission windows to each service according to an embodiment of this application.

For example, refer to FIG. 7. The four services and the 12 transmission resources in the example shown in FIG. 4 are still used as examples. First, for the $1^{st}$ transmission resource, the forwarding device may multiply the quantity of transmission windows required by S1 and 12 to obtain a product, namely, 48; and divide the product by 12 to obtain a remainder, namely, 0. The remainder is less than the quantity of transmission windows required by S1, and therefore, it can be learned that S1 expects to use the $1^{st}$ transmission resource. For the remaining S2 to S4, because a remainder corresponding to each of the three services is less than a quantity of transmission windows required by the service, it can be learned that the three services all expect to use the $1^{st}$ transmission resource. In this case, it may be determined that the candidate service identifiers corresponding to the $1^{st}$ transmission resource include service identifiers of all the services. For the second transmission resource, the forwarding device may sequentially determine, with reference to the foregoing method, remainders corresponding to the four services, which are 8, 9, 10, and 9. Each of the four remainders is not less than the quantity of transmission windows required by the corresponding service. Therefore, it may be determined that no service expects to use the second transmission resource, in other words, the candidate service identifiers corresponding to the second transmission resource are empty. The rest may be deduced by analogy. For the third to the twelfth transmission resources, the forwarding device may determine the corresponding candidate service identifiers with reference to the foregoing method; and finally determines that the candidate service identifiers corresponding to the third, the sixth, the eighth, the eleventh, and the twelfth transmission resources are also empty, the candidate service identifiers corresponding to the fourth and the tenth transmission resources both are S1, the candidate service identifiers corresponding to the fifth and the ninth transmission resources both are S2 and S4, and the candidate service identifiers corresponding to the seventh transmission resource are S1 and S3.

It can be learned from the foregoing description that, in this implementation, for the $j^{th}$ transmission resource in the k transmission resources, when the candidate service identifiers corresponding to the $j^{th}$ transmission resource are determined, actually, the $j^{th}$ transmission resource is considered as the $(j+k-1)^{th}$ transmission resource for evaluation. In this case, the $1^{st}$ transmission resource is considered as the $k^{th}$ transmission resource for evaluation. In this way, the $1^{st}$ transmission resource is a transmission resource that all the services expect to use. In other words, the candidate service identifiers corresponding to the $1^{st}$ transmission resource include the service identifiers of all the services, and cannot be empty. In this case, the forwarding device does not need to determine the candidate service identifiers corresponding to all the transmission resources in advance, and it is still ensured that each transmission window is immediately allocated starting from the first transmission window in the slot.

Figure 8:
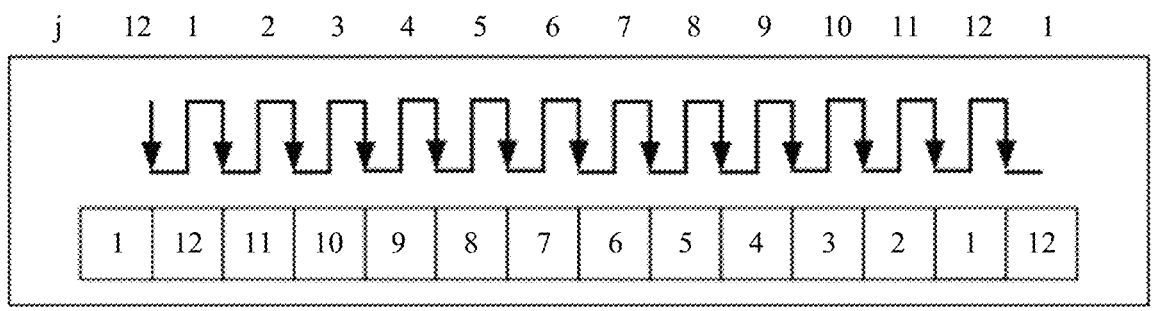
FIG. 8 is still another schematic diagram of a trigger signal for determining candidate service identifiers corresponding to the $j^{th}$ transmission resource according to an embodiment of this application.

It should be noted that, when the second manner is used to sequentially detect whether each service expects to use the transmission resources, for the $j^{th}$ transmission resource in the k transmission resources, the forwarding device may trigger, by using the clock pulse signal whose number is j shown in FIG. 5, the operation of determining the candidate service identifiers corresponding to the $j^{th}$ transmission resource. Optionally, refer to FIG. 8. The forwarding device may alternatively trigger the operation by using a value $m-j+1$ and the corresponding clock pulse signal. This is not limited in this embodiment of this application.

The foregoing are two implementations of determining the candidate service identifiers corresponding to the transmission resources described in this embodiment of this application. In some possible cases, the forwarding device may also detect, in another manner, whether a service expects to use a transmission resource.

For example, when k is equal to the largest quantity of transmission windows, the forwarding device may calculate a quotient of the quantity of transmission windows required by each service and k, to obtain a service step of each service. Then, for the $1^{st}$ transmission resource, the forwarding device may sum up the service step of each service and an initial accumulated value to obtain an accumulated step of each service. Service identifiers of services whose accumulated steps are not less than 1 are used as the candidate service identifiers of the $1^{st}$ transmission resource. Then, for the second transmission resource, the forwarding device may subtract one from the accumulated step of each service identified by the candidate service identifiers of the $1^{st}$ transmission resource, to obtain current accumulated steps of the services corresponding to the $1^{st}$ transmission resource. For remaining services, the foregoing method in which a sum of a service step of a corresponding service and a last determined accumulated step of the service at a current moment is calculated to obtain a current accumulated step of the service is used. Then, the forwarding device may compare the current accumulated step of each service with 1, and determine the candidate service identifiers corresponding to the second transmission resource. This process is repeated until the candidate service identifiers corresponding to all the transmission resources are determined.

It can be learned from the foregoing description that the total quantity of transmission windows required by n services may be less than m, or may be equal to m. Based on this, after the service identifier buffer queue is generated, if the total quantity of transmission windows required by the n services is less than m, the forwarding device may sequentially allocate, based on the sequence of the m transmission windows, the m transmission windows to the services identified by the service identifiers in the service identifier buffer queue. If the total quantity of transmission windows required by the n services is less than m, the forwarding device may sequentially allocate, based on the sequence of the m transmission windows, the quantity of transmission windows in the m transmission windows that is equal to the total quantity of transmission windows required by the n services to the services identified by the service identifiers in the service identifier buffer queue.

For example, starting from the first service identifier in the service identifier buffer queue, the forwarding device may allocate the first transmission window in the m transmission windows to a service identified by the first service identifier in the service identifier buffer queue, and allocate the second transmission window to a service identified by the second service identifier in the service identifier buffer queue. The rest may be deduced by analogy, and the forwarding device may allocate the $j^{th}$ transmission window to a service identified by the $j^{th}$ service identifier in the service identifier buffer queue. In this way, for each allocated transmission window, the transmission window corresponds to one service, and a sequence number of the transmission window in the m transmission windows is the same as a sequence number of a corresponding service in the service identifier buffer queue. It should be noted that the first service identifier in the service identifier buffer queue is a service identifier located at the head of the queue, and the second service identifier is located after the first service identifier. The rest may be deduced by analogy, and the last service identifier is a service identifier located at the tail of the service identifier buffer queue.

For example, refer to FIG. 4. The candidate service identifiers corresponding to the first transmission resource and the second transmission resource both are empty, and the candidate service identifier corresponding to the third transmission resource is S1. Therefore, the first service identifier in the service identifier buffer queue is S1. The candidate service identifiers corresponding to the fourth transmission resource are S2 and S4. Therefore, the second service identifier in the service identifier buffer queue is S2, and the third service identifier is S4. The candidate service identifier corresponding to the fifth transmission resource is empty, and the candidate service identifiers corresponding to the sixth transmission resource are S1 and S3. Therefore, the fourth service identifier in the service identifier buffer queue is S1, and the fifth service identifier in the service identifier buffer queue is S3. The rest may be deduced by analogy. The finally obtained service identifier buffer queue is as follows: S1, S2, S4, S1, S3, S2, S4, S1, S1, S2, S3, and S4. After the service identifier buffer queue is determined, it is assumed that m=12, in other words, there are 12 transmission windows. Therefore, the forwarding device may allocate, based on the sequence of the 12 transmission windows and the sequence of the service identifiers, the first transmission window to S1, the second transmission window to S2, the third transmission window to S4, and the fourth transmission window to S1, and this process is repeated until the transmission windows are correspondingly allocated to all 12 service identifiers in the service identifier buffer queue. Similarly, refer to FIG. 7. The service identifier buffer queue obtained based on the candidate service identifiers corresponding to the transmission resources is as follows: S1, S2, S3, S4, S1, S2, S4, S1, S3, S2, S4, and S1. In this case, as shown in the figure, the forwarding device may sequentially allocate, based on the foregoing buffer queue, the 12 transmission windows to the services identified by the service identifiers in the service identifier buffer queue.

It should be noted that FIG. 4 and FIG. 7 show the diagrams in which when k is equal to m and the total quantity of transmission windows required by the n services is also equal to m, the service identifier buffer queue is generated based on the candidate service identifiers corresponding to each transmission resource, and the transmission windows are further allocated to each service based on the service identifier buffer queue. Certainly, if the total quantity of transmission windows required by n services is less than m, correspondingly, a quantity of candidate service identifiers included in the service identifier buffer queue is also less than m. In this case, similarly, the corresponding transmission windows may be allocated to each candidate service identifier in the service identifier buffer queue with reference to the foregoing method.

Figure 9:
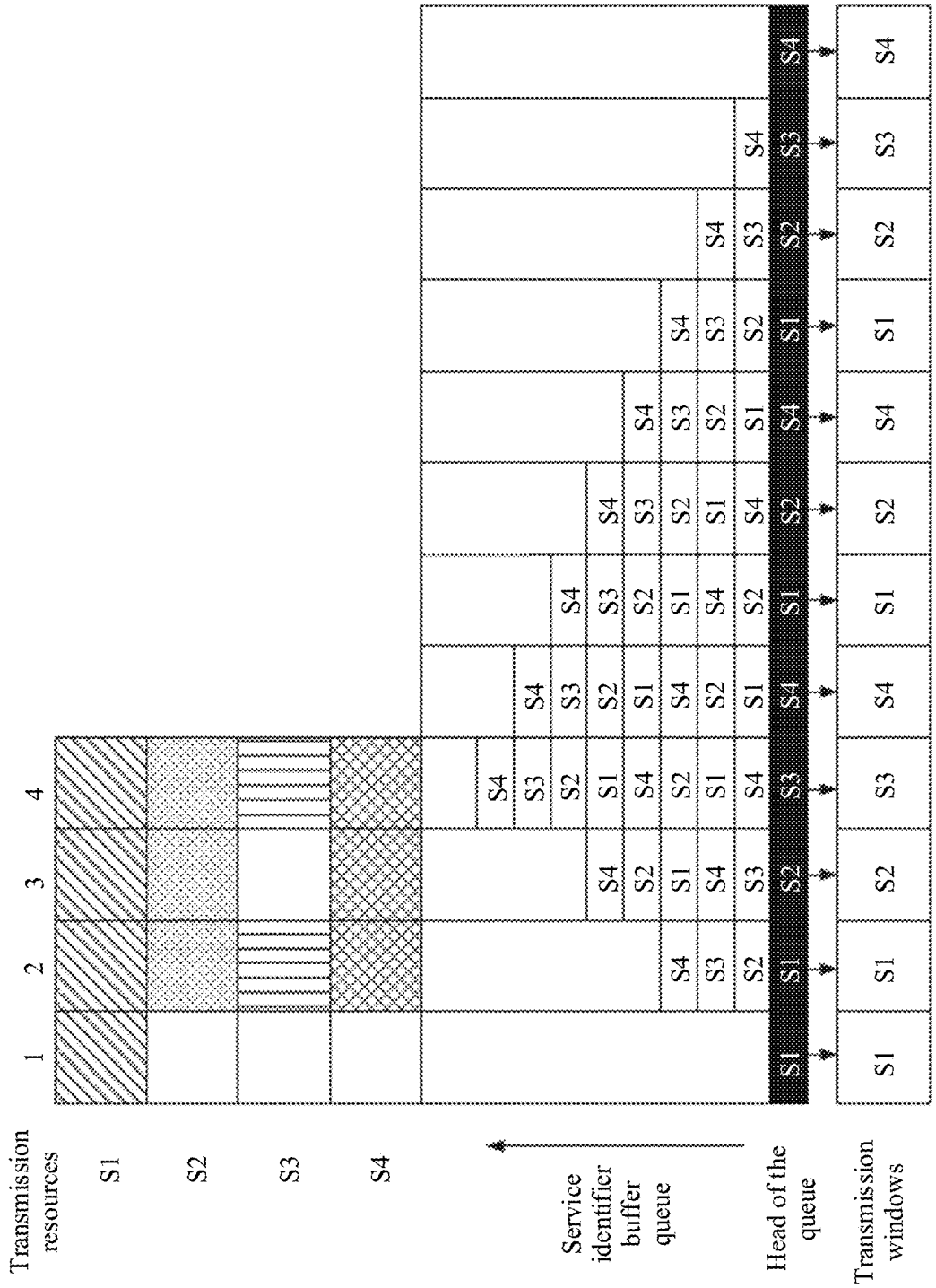
FIG. 9 is still another schematic diagram of allocating transmission windows to each service according to an embodiment of this application.

Optionally, FIG. 9 shows a diagram in which when k is less than m and k is equal to the largest quantity of transmission windows Cmax in the quantities of transmission windows required by n services, the service identifier buffer queue is generated based on the candidate service identifiers corresponding to each transmission resource, and the transmission windows are further allocated to each service based on the service identifier buffer queue.

As shown in FIG. 9, the four services and the 12 transmission windows are still used as examples. The largest quantity of transmission windows in the quantities of transmission windows required by the four services is 4. Therefore, k=4, in other words, there are four transmission resources. In this case, for the $1^{st}$ transmission resource, the forwarding device multiplies the quantity of transmission windows required by S1 and 1 to obtain the product, namely, 4; and divides the product by 4 to obtain a remainder, namely, 0. The remainder is less than the quantity of transmission windows required by S1. Therefore, it can be learned that S1 expects to use the $1^{st}$ transmission resource. For S2 to S4, it is determined, by using the same method, that the corresponding remainders are 3, 2, and 3, and each of the remainders is not less than the quantity of transmission windows required by the corresponding service. Therefore, it can be learned that the other services do not expect to use the $1^{st}$ transmission resource. In this case, it may be determined that the candidate service identifier corresponding to the $1^{st}$ transmission resource is S1. The forwarding device may add S1 to the tail of the service identifier buffer queue. Then, the forwarding device may continue to determine, by using the foregoing method, the candidate service identifiers corresponding to the second transmission resource, which are S1, S2, S3, and S4; and add, based on a sequence of services identified by the service identifiers, the candidate service identifiers corresponding to the second transmission resource to the tail of the service identifier buffer queue. The rest may be deduced by analogy. Candidate service identifiers S1, S2, and S4 corresponding to the third transmission resource, and candidate service identifiers S1, S2, S3, and S4 corresponding to the fourth transmission resource are sequentially added to the service identifier buffer queue. In this case, the obtained service identifier buffer queue is as follows: S1, S1, S2, S3, S4, S1, S2, S4, S1, S2, S3, and S4. Then, with reference to the foregoing related method, the forwarding device may allocate corresponding transmission windows to each service based on the sequence of the 12 transmission windows and the service identifier buffer queue.

Optionally, in a possible case, when sequentially determining the candidate service identifiers corresponding to each of the k transmission resources, the forwarding device may alternatively consider the $j^{th}$ transmission resource as the $(j+k-1)^{th}$ transmission resource for evaluation with reference to the method described in the foregoing second manner. In other words, for the $j^{th}$ transmission resource, the forwarding device may determine a product of the quantity of transmission windows required by the $i^{th}$ service and j+k−1. Then, the forwarding device may determine a remainder by dividing the product by k. If the remainder is less than the quantity of transmission windows required by the $i^{th}$ service, the forwarding device determines that the $i^{th}$ service expects to use the $j^{th}$ transmission resource. If the remainder is not less than the quantity of transmission windows required by the $i^{th}$ service, the forwarding device determines that the $i^{th}$ service does not expect to use the $j^{th}$ transmission resource.

It should be noted that, in this implementation, the forwarding device determines, based on the largest quantity of transmission windows in the quantities of transmission windows required by the n services and the quantity of transmission windows required by each service, the candidate service identifiers corresponding to each transmission resource. In this way, the forwarding device only needs to determine candidate service identifiers corresponding to $C_{max}$ transmission resources to obtain one service identifier buffer queue. In other words, the forwarding device only needs to perform $C_{max}$ evaluation operations to obtain the service identifier buffer queue, and further completes allocation of the transmission windows based on the service identifier buffer queue. Compared with m evaluation operations performed to determine the candidate service identifiers corresponding to the m transmission resources shown in FIG. 4 and FIG. 7, a quantity of evaluation operations is reduced.

The foregoing is the first implementation of determining, based on the quantity of transmission windows required by each of the n services, the candidate service identifiers corresponding to each of the k transmission resources; and then allocating the corresponding transmission windows to each service based on the candidate identifiers corresponding to each transmission resource provided in this embodiment of this application. Next, a second implementation of the foregoing process is described in the embodiments of this application.

(2) The forwarding device sequentially detects, based on the quantity of transmission windows required by each of the n services, whether each of the n services expects to use the first transmission resource, where the first transmission resource is any one of the k transmission resources; and if none of the n services expects to use the first transmission resource, determines that the candidate service identifiers corresponding to the first transmission resource are empty; or if the service that expects to use the first transmission resource exists in the n services, uses the service identifiers of the one or more services expecting to use the first transmission resource as the candidate service identifiers of the first transmission resource. When the candidate service identifiers corresponding to the first transmission resource are determined, the service identifier buffer queue is generated based on the candidate service identifiers corresponding to the first transmission resource. Starting from the first transmission window in current remaining transmission windows of the m transmission windows, corresponding transmission windows are sequentially allocated to a service identified by each service identifier in the service identifier buffer queue, and an allocated service identifier is deleted from the buffer queue. When it is detected that the service identifier buffer queue is empty, a second transmission resource is used as the first transmission resource, and a step of sequentially detecting, based on the quantity of transmission windows required by each of the n services, whether each of the n services expects to use the first transmission resource is re-performed, where the second transmission resource is located after the first transmission resource and adjacent to the first transmission resource.

In this implementation, the forwarding device may determine the candidate service identifiers corresponding to the first transmission resource with reference to content described in the foregoing implementation. After obtaining the candidate service identifiers corresponding to the first transmission resource, the forwarding device may generate one service identifier buffer queue based on the candidate service identifiers corresponding to the first transmission resource, where the service identifier buffer queue includes only the candidate service identifiers corresponding to the first transmission resource. For an implementation of generating the service identifier buffer queue based on the candidate service identifiers corresponding to the first transmission resource, refer to the implementation of generating the service identifier buffer queue in the foregoing implementation. Details are not described in this embodiment of this application.

After generating the service identifier buffer queue based on the candidate service identifiers corresponding to the first transmission resource, the forwarding device may sequentially allocate, based on the foregoing related implementation, corresponding transmission windows to services identified by the service identifiers in the service identifier buffer queue. Each time corresponding transmission windows are allocated to a service identifier, the service identifier may be deleted from the service identifier buffer queue.

When it is detected that the service identifier buffer queue is empty, in other words, after all the service identifiers in the service identifier buffer queue corresponding to the first transmission resource are allocated to the corresponding transmission windows, the forwarding device may continue to determine, by using the foregoing method, candidate service identifiers corresponding to a next transmission resource. Then, one service identifier buffer queue is generated again based on the candidate service identifiers corresponding to the next transmission resource, and transmission windows are allocated based on the service identifier buffer queue. This process is repeated until the last transmission resource is processed.

It should be noted that, in this implementation, k may be less than m, and be less than the total quantity of transmission windows required by the n services. The following describes the foregoing process by using an example in which k is equal to the largest quantity of transmission windows in the quantities of transmission windows required by the n services.

$w_1$ candidate service identifiers corresponding to the $1^{st}$ transmission resource are first determined based on the sequence of the k transmission resources. When determining the candidate service identifiers corresponding to the $1^{st}$ transmission resource, the forwarding device may multiply the quantities of transmission windows required by the services and the sequence number of the transmission resource, namely, 1 to obtain n products. Then, the forwarding device may divide the n products by $C_{max}$ to obtain n remainders. A service whose corresponding remainder is less than a quantity of transmission windows required by the service is selected from the n services, and service identifiers of the selected services are used as the $w_1$ candidate service identifiers corresponding to the $1^{st}$ transmission resource.

After determining the $w_1$ candidate service identifiers corresponding to the $1^{st}$ transmission resource, the forwarding device may generate, based on the $w_1$ candidate service identifiers, one service identifier buffer queue in a sequence of services identified by the $w_1$ candidate service identifiers; and sequentially allocate, based on the sequence of the m transmission windows, the first to the $w_1^{th}$ transmission windows to services identified by the first to the $w_1^{th}$ service identifiers in the service identifier buffer queue. Each time one service identifier is allocated, the forwarding device may delete the service identifier from the buffer queue.

After allocating corresponding transmission windows to the last service identifier in the service identifier buffer queue, the forwarding device may determine candidate service identifiers corresponding to the second transmission resource. The forwarding device may multiply the quantities of transmission windows required by the services and a sequence number of the transmission resource, namely, 2 to obtain n products; and then determine remainders by dividing the products by $C_{max}$. The forwarding device selects a service whose corresponding remainder is less than the quantity of transmission windows required by the service from the n services, and uses service identifiers of the selected service as the candidate service identifiers corresponding to the second transmission resource. Subsequently, with reference to the described manner, the forwarding device may generate one service identifier buffer queue based on the candidate service identifiers corresponding to the second transmission resource, allocate the first transmission window in remaining transmission windows of the m transmission windows to the first service identifier in the service identifier buffer queue, and allocate the second transmission window to the second service identifier in the service identifier buffer queue. This process is repeated until allocation is completed. Similarly, each time one service identifier is allocated, the service identifier is deleted from the service buffer queue.

After allocating transmission windows to the service identifiers in the service identifier buffer queue, the forwarding device may determine candidate service identifiers of the third transmission resource with reference to the foregoing method. This process is repeated until the $C_{max}{}^{th}$ transmission resource is determined and the m transmission windows are all allocated.

Figure 10:
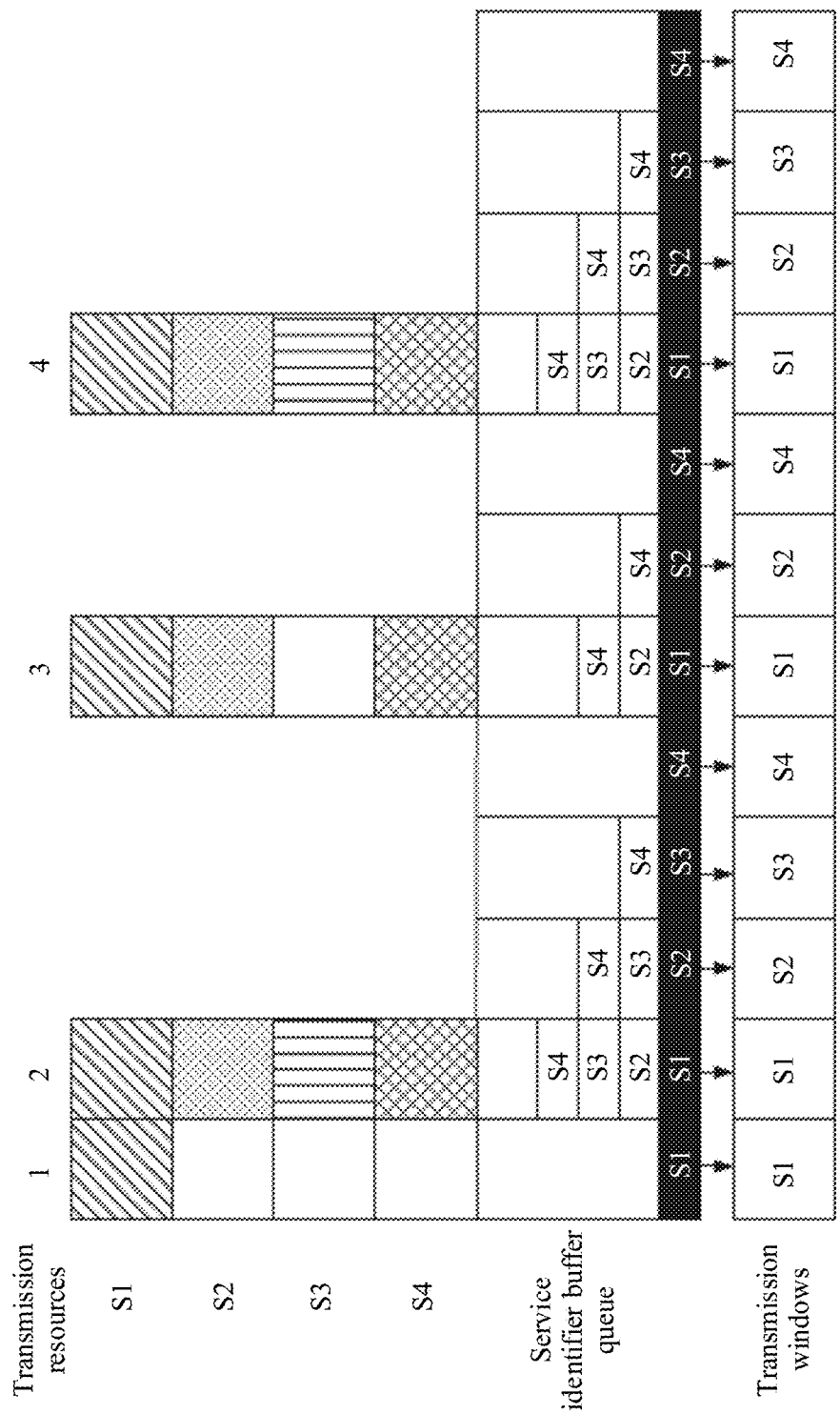
FIG. 10 is still another schematic diagram of allocating transmission windows to each service according to an embodiment of this application.

FIG. 10 is a schematic diagram of allocating transmission windows to a service by using the foregoing method according to an embodiment of this application. As shown in FIG. 10, the four services and the 12 transmission windows in FIG. 4 are still used as examples. $C_{max}=4$, and therefore, k=4, in other words, there are four transmission resources. In this case, the forwarding device may first determine the candidate service identifiers corresponding to the $1^{st}$ transmission resource. The forwarding device may multiply the quantities of transmission widows required by the service and 1 to obtain four products, which are 4, 3, 2, and 3; and dividing the products by 4 to obtain four remainders, which are 0, 3, 2, and 3. Only a remainder corresponding to S1 is less than the quantity of transmission windows required by S1. Therefore, S1 may be used as the candidate service identifier corresponding to the $1^{st}$ transmission resource. In this case, there is only one service identifier S1 in the service identifier buffer queue obtained based on the candidate service identifiers corresponding to the $1^{st}$ transmission resource. The forwarding device may allocate the first transmission window in the 12 transmission windows to S1.

After allocating the first transmission window to S1, the forwarding device may determine the candidate identifiers corresponding to the second transmission resource. In this case, the forwarding device may multiply the quantities of transmission windows required by the services and 2 to obtain four products, which are 8, 6, 4, and 6; and dividing the products by 4 to obtain four remainders, which are 0, 2, 0, and 2. The remainders corresponding to all the services are less than the quantities of transmission windows required by the services. Therefore, it may be determined that the candidate service identifiers corresponding to the second transmission resource are S1, S2, S3, and S4. In this case, the service identifier buffer queue obtained based on the candidate service identifiers corresponding to the second transmission resource are as follows: S1, S2, S3, and S4. In this case, starting from the second transmission window, the forwarding device may sequentially allocate the second transmission window to the fifth transmission window to the services identified by S1, S2, S3, and S4.

After allocating the fifth transmission window to the service identified by the last service identifier S4 in the service identifier buffer queue, the forwarding device may next determine the candidate service identifiers corresponding to the third transmission resource. In this case, the forwarding device multiplies the quantities of transmission windows required by the services and 3 to obtain four products, which are 12, 9, 6, and 9; and divides the products by 4 to obtain remainders, which are 0, 1, 2, and 1. It can be learned that, except that the remainder corresponding to S3 is not less than the quantity of transmission windows required by S3, the remainders corresponding to remaining services are all less than the quantities of transmission windows required by the services. Therefore, it may be determined that the candidate service identifiers corresponding to the third transmission resource are S1, S2, and S4, and the service identifier buffer queue generated based on these candidate service identifiers are as follows: S1, S2, and S4. Then, the forwarding device sequentially allocates the sixth transmission window to the eighth transmission window to the services identified by S1, S2, and S4.

After allocating the eighth transmission window to the service identified by the last service identifier S4 in the service identifier buffer queue, the forwarding device may determine, with reference to the foregoing implementation, candidate service identifiers corresponding to the fourth transmission resource, which are S1, S2, S3, and S4. Then, with reference to the manner described above, the forwarding device may sequentially allocate the last four transmission windows to the services identified by S1, S2, S3, and S4.

It can be learned from the foregoing description that, in this implementation, the forwarding device determines a maximum of $C_{max}$ candidate service identifiers of transmission resources, in other words, performs evaluation for a maximum of $C_{max}$ times. In addition, in this implementation, each time after generating one service identifier buffer queue based on candidate service identifiers corresponding to one transmission resource, the forwarding device performs next evaluation only after all transmission windows are allocated to services identified by all the service identifiers in the service identifier buffer queue. In this way, a length of the service identifier buffer queue is not excessively long, thereby reducing implementation costs.

Optionally, in the method described above, when determining the candidate service identifiers corresponding to the $j^{th}$ transmission resource, the forwarding device may alternatively use the $j^{th}$ transmission resource as the $(j+k-1)^{th}$ transmission resource for processing. In other words, for the $j^{th}$ transmission resource, the forwarding device may multiply the quantities of transmission windows required by the services and j+k−1.

It should be noted that, in this embodiment of this application, all the n services may be valid services. In this way, when the total quantity of transmission windows required by the n services is equal to m, after all the m transmission windows are allocated to the n services by using the foregoing method, each transmission window carries service data of one service. Optionally, in a possible case, then services may include a part of valid services and a part of idle services. In other words, in the embodiments of this application, to ensure that transmission windows carrying the valid services can be evenly distributed within the unit time period or in the unit data frame, the forwarding device may construct one or more idle services, and a quantity of transmission windows required by the one or more idle services is equal to a difference between m and a total quantity of transmission windows required by all the valid services. Then, the forwarding device may mix the constructed idle services into the valid services, to obtain the n services, and allocate the corresponding transmission windows to the services by using the foregoing method. Because these services are idle services, in step 303, padding bits may be sent in the transmission windows corresponding to these idle services.

The foregoing mainly describes a process in which the forwarding device simultaneously determines the candidate service identifiers corresponding to each transmission resource, and generates the service identifier buffer queue based on the candidate service identifiers, to allocate the transmission windows. The following describes two implementations in which the forwarding device sequentially allocates the transmission windows.

Second implementation: allocating, from the m transmission windows, $C_1$ transmission windows to the first service in the n services based on a quantity $C_1$ of transmission windows required by the first service and m; and allocating, from remaining transmission windows in the m transmission windows, $C_i$ transmission windows to the $i^{th}$ service in the n services based on a quantity $C_i$ of transmission windows required by the $i^{th}$ service and m, where the remaining transmission windows are remaining transmission windows in the m transmission windows other than transmission windows allocated to the first i−1 services, and i is an integer greater than 1.

In this implementation, the forwarding device may sequentially allocate corresponding transmission windows to each service based on the sequence of the services. In this way, for the first service, the forwarding device may select the $C_1$ transmission windows from the m transmission windows. For the subsequent other services, the forwarding device may only allocate a required quantity of transmission windows to a corresponding service from the remaining unallocated transmission windows.

For example, for the first service, the forwarding device may multiply a quantity $C_1$ of transmission windows required by the first service and sequence numbers of the m transmission windows to obtain m products. The sequence number of each transmission window is a sequence number of the corresponding transmission window in the m transmission windows. For example, for the first transmission window in the m transmission windows, a sequence number of the transmission window is 1, and for the $j^{th}$ transmission window in the m transmission windows, a sequence number of the transmission window is j. After obtaining the m products, the forwarding device may divide the products by m to obtain remainders. Then, the forwarding device may select, from the m transmission windows, transmission windows whose corresponding remainders are less than $C_1$, and allocate the selected transmission windows to the first service.

For the second service, the $C_1$ transmission windows in the current m transmission windows have been allocated to the first service, and a quantity of remaining unallocated transmission windows is m−$C_1$. Based on this, the forwarding device may multiply a quantity $C_2$ of transmission windows required by the second service and the sequence numbers of the m transmission windows to obtain m products. After obtaining the m products, the forwarding device may divide the products by m−$C_1$ to obtain remainders. Then, the forwarding device may select, from the m transmission windows, transmission windows whose corresponding remainders are less than $C_2$, and allocate the selected transmission windows to the second service.

The rest may be deduced by analogy. For the $i^{th}$ service, a quantity of unallocated remaining transmission windows is m−($C_1$+ . . . +$C_i$−1). In this case, the forwarding device may multiply the quantity $C_i$ of transmission windows required by the $i^{th}$ service and the sequence numbers of the m transmission windows to obtain m products. After obtaining the m products, the forwarding device may divide the products by m−($C_i$+ . . . +$C_i$−1) to obtain remainders. Then, the forwarding device may select, from the m transmission windows, transmission windows whose corresponding remainders are less than $C_i$, and allocate the selected transmission windows to the $i^{th}$ service, where i is not greater than n.

It should be noted that, for the last service, if m is exactly equal to the total quantity of transmission windows required by all the services, after the transmission windows are allocated to the first n−1 services, the quantity of remaining transmission windows is exactly equal to a quantity of transmission windows required by the last service. In this case, the forwarding device may directly allocate the last remaining transmission windows to the last service.

Third implementation: assigning i=1 and j=1, and determining, based on a quantity of transmission windows required by the $i^{th}$ service and m, whether the $i^{th}$ service expects to use the $h^{th}$ transmission window, where h is equal to j or h is equal to m−j+1; and if the $i^{th}$ service expects to use the $h^{th}$ transmission window, allocating the $h^{th}$ transmission window to the $i^{th}$ service; and assigning i=1 and j=j+1, and returning to a step of determining whether the $i^{th}$ service expects to use the $h^{th}$ transmission window until j=m; or if the $i^{th}$ service does not expect to use the $h^{th}$ transmission window, assigning i=i+1, returning to a step of determining whether the $i^{th}$ service expects to use the $h^{th}$ transmission window until i=n, and allocating the $h^{th}$ transmission window to the $n^{th}$ service; and assigning i=1 and j=j+1, and returning to the step of determining whether the $i^{th}$ service expects to use the $h^{th}$ transmission window. j is a sequence number of the transmission window.

In this implementation, when h is equal to j, for the $j^{th}$ transmission window, the forwarding device may first evaluate whether the first service expects to use the transmission window. If the first service does not expect to use the transmission window, the forwarding device may continue to evaluate whether the second service expects to use the transmission window. The rest may be deduced by analogy; and if the (n−1)$^{th}$ service still does not expect to use the transmission window, the forwarding device may directly allocate the transmission window to the last service. If it is determined that a service expects to use the transmission window, the forwarding device may allocate the transmission window to the service, and no further evaluation is performed for another service after the service. The forwarding device may directly start to evaluate a next transmission window.

For example, for the first transmission window, the forwarding device may first evaluate whether the first service expects to use the transmission window. In this case, for the first service, this is the first time of evaluation. Based on this, the forwarding device may set $Q_1$ to 1, multiply the quantity of transmission windows $C_1$ required by the first service and $Q_1$, and obtain a remainder by dividing the product by m. If the remainder is less than $C_1$, the forwarding device may allocate the first transmission window to the first service. If the remainder is not less than $C_1$, the forwarding device may continue to evaluate whether the second service expects to use the transmission window. In this case, for the second service, this is also the first time of evaluation. Therefore, the forwarding device may set $Q_2=1$, multiply a quantity $C_2$ of transmission windows required by the second service and $Q_2$, and obtain a remainder by dividing the product by $m-C_1$. If the remainder is less than $C_2$, the forwarding device may allocate the transmission window to the second service. If the remainder is not less than $C_2$, the forwarding device may continue to evaluate, with reference to the foregoing method, whether the third service expects to use the transmission window. The rest may be deduced by analogy.

After allocating the first transmission window to the $i^{th}$ service, the forwarding device may then allocate the second transmission window. When allocating the second transmission window, the forwarding device still evaluates starting from the first service. When evaluating the $j^{th}$ transmission window, the forwarding device may determine a quantity of times of evaluating the service before, and increase the quantity of times by 1 to obtain $Q_i$. Then, the forwarding device may multiply the quantity $C_i$ of transmission windows required by the $i^{th}$ service and $Q_i$; and obtain a remainder by dividing the product by $m-(C_1+ \ldots +C_i-1)$. Then, the forwarding device may determine, with reference to the foregoing method, whether to allocate the current transmission window to the $i^{th}$ service by comparing the remainder with $C_i$.

Optionally, when $h=m-j+1$, for an implementation, refer to an implementation when $h=j$. Different from the foregoing implementation, in this case, it is equivalent that allocation is performed starting from the last transmission window in the m transmission windows.

It should be noted that, in the second manner and the third manner described above, if the total quantity of transmission windows is equal to the total quantity of transmission windows required by the n services, all the m transmission windows may be allocated to the n services by using the foregoing method. If the total quantity m of transmission windows is greater than the total quantity of transmission windows required by the n services, some remaining transmission windows still exist after the transmission windows are allocated to the n services. In this embodiment of this application, for the remaining transmission windows, the forwarding device may transmit, by using the transmission windows, service configuration parameters within the unit time period or in the unit data frame. The service configuration parameters may include the quantity of transmission windows required by each service within the unit time period or in the unit data frame, and may further include the total quantity m of transmission windows included in the slot.

Step 303: Multiplex, based on the transmission windows corresponding to each service, the service data of the n services into data transmitted in one channel, and send the multiplexed data.

After allocating the corresponding transmission windows to each service, the forwarding device may multiplex, based on the transmission windows corresponding to each service, the service data of the n services into the data transmitted in one channel, so that the multiplexed service data can be transmitted in the m transmission windows in the specified slot.

Figure 11:
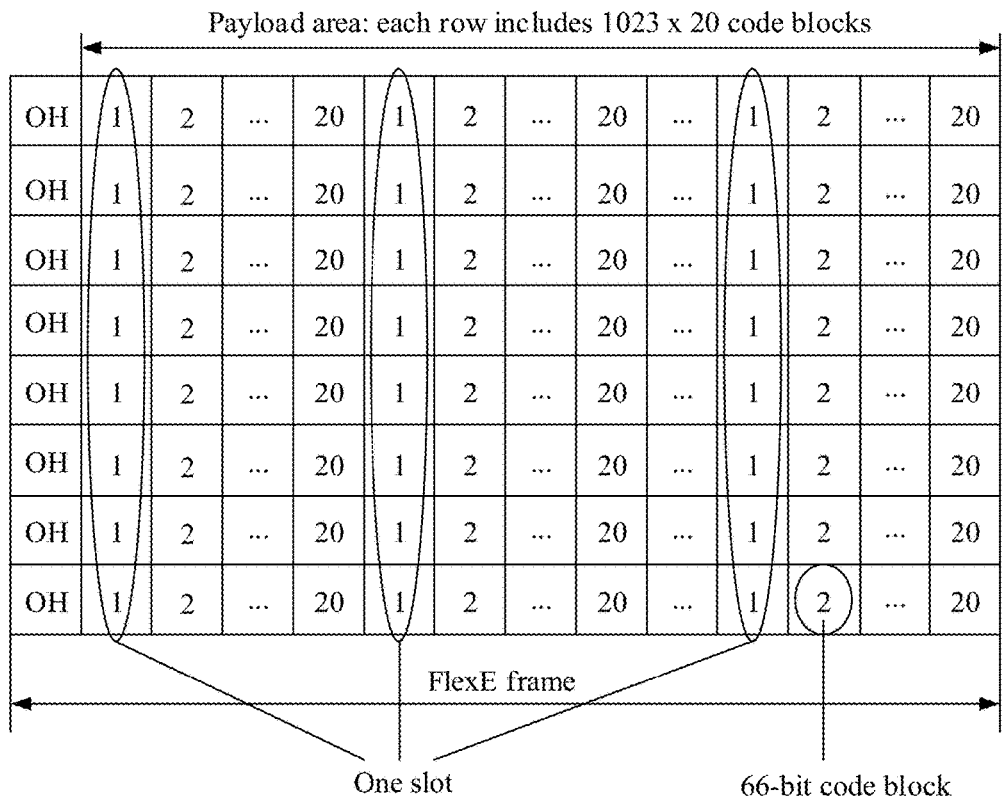
FIG. 11 is a schematic diagram of a data structure of a FlexE frame according to an embodiment of this application.
Figure 12:
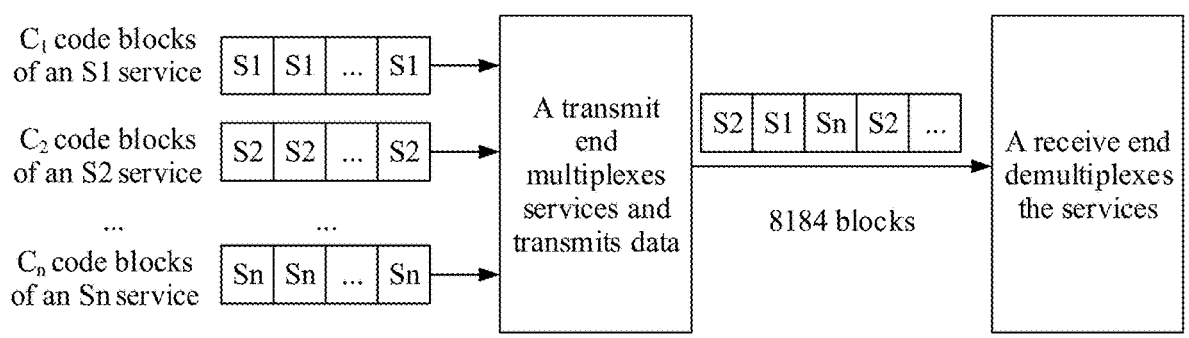
FIG. 12 is a schematic diagram in which n services are multiplexed within a slot of a FlexE frame according to an embodiment of this application.

For example, refer to FIG. 11. One FlexE frame may include eight rows, and the first 66-bit code block in each row is an overhead area. In other words, the FlexE frame includes eight overhead areas of 66-bit code blocks. In addition to the overhead areas, a remaining area is a payload area. Each row in the payload area includes 1023×20 66-bit code blocks. In this way, the payload area includes (1023×20)×8 66-bit code blocks. The payload area may be divided into 20 slots. As shown in FIG. 11, 66-bit code blocks with a same number belong to one slot. In this way, one slot includes 1023×8 66-bit code blocks. It is assumed that one 66-bit code block is used as one transmission window. Therefore, one slot includes 1023×8 transmission windows, namely, 8184 transmission windows. After transmission windows corresponding to each service in one slot is determined by using the foregoing method, refer to FIG. 12. It is assumed that the quantity of transmission windows required by the S1 service is $C_1$. Therefore, there are $C_1$ transmission windows (namely, the 66-bit code block) corresponding to the S1 service. In this way, $C_1$ code blocks that carry service data of S1 may be obtained. Similarly, for S2 to Sn, service data may be carried by using corresponding transmission windows. Then, the forwarding device may use 66-bit code blocks that carry the service data of the n services as the data transmitted in one channel, and transmit, in the slot, the data transmitted in one channel obtained through multiplexing.

Figure 13:
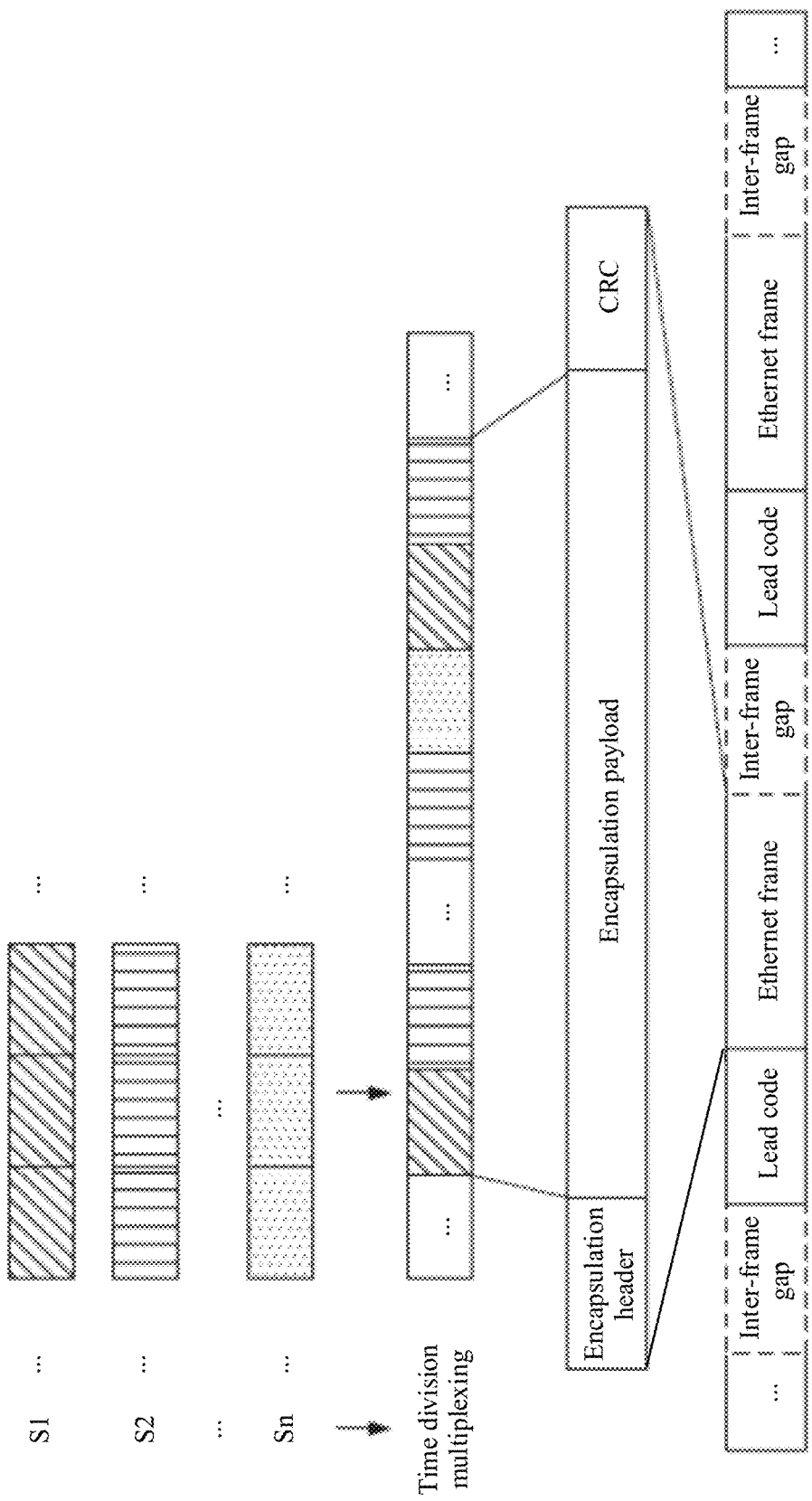
FIG. 13 is a schematic diagram of sending n services by using an Ethernet frame according to an embodiment of this application.

Optionally, in a possible case, the forwarding device may alternatively use an Ethernet frame format to carry the multiplexed data of the n services. In this case, refer to FIG. 13. The forwarding device may interleave the n services based on the transmission windows corresponding to the n services, to form a multiplexed data stream. Then, the forwarding device may generate an encapsulation header, where the header is used to carry parameters such as the quantity of transmission windows required by each service that forms the multiplexed data stream and the total quantity m of transmission windows in the slot; use the multiplexed data stream as an encapsulation payload; and place the multiplexed data stream after the encapsulation header, to obtain encapsulated data. Finally, the forwarding device may use the encapsulated data as the Ethernet frame to generate an Ethernet data stream, and send the Ethernet data stream by using one or more slots of a FlexE interface.

After the plurality of services are sent by using the foregoing method, for a downstream forwarding device serving as a receive end, the forwarding device may determine, based on the service configuration parameters in the slot, the transmission windows corresponding to each service by using a method the same as that of an upstream forwarding device, in other words, determines transmission windows by which each service is carried. In this way, the downstream forwarding device may demultiplex the received service based on the determined transmission windows corresponding to each service, to restore each service.

It should be noted that, to ensure that the downstream forwarding device can correctly demultiplex, in this embodiment of this application, when sending each service based on the transmission windows of each service, the upstream forwarding device further needs to transmit the service configuration parameters in the slot to the downstream forwarding device.

In a possible case, a total quantity of transmission windows included in each slot may be fixed, and to-be-mapped services included in each slot may also be fixed. In other words, each slot includes n to-be-mapped services, and the quantity of transmission windows required by each service is fixed. In this case, the upstream forwarding device only needs to send the service configuration parameters to the downstream forwarding device once.

Optionally, in another possible case, the to-be-mapped services included in each slot are not fixed. In other words, quantities of to-be-mapped services in slots are different.

Alternatively, the quantities of to-be-mapped services in the slots are the same, but quantities of transmission windows required by the services are different. Alternatively, both of the two quantities are different. In this case, the upstream forwarding device may transmit the service configuration parameters in the slot in real time before or when sending the multiplexed service data in each slot, so that after receiving the service, the downstream forwarding device can perform correct demultiplexing on the service based on the service configuration parameters.

In this embodiment of this application, a transmit end may obtain the quantity of transmission windows required by each of then to-be-mapped services within the unit time period or in the unit data frame, where the unit time period or the unit data frame includes the m transmission windows. Then, the transmit end may allocate, from the m transmission windows, the corresponding transmission windows to each service based on the quantity of transmission windows required by each service; and multiplex, based on the transmission windows corresponding to each service, the service data of the n services into the data transmitted in one channel, and send the multiplexed data. It can be learned that in this embodiment of this application, the unit time period or the unit data frame may be divided into the m transmission windows, and then the corresponding transmission windows are allocated to each service to transmit the service. In this way, the plurality of services may be multiplexed within one time period or in one data frame for service transmission, thereby avoiding a waste of bandwidth resources in the related technology that occurs because the one time period or the one data frame can carry only one service.

In addition, in this embodiment of this application, the upstream forwarding device serving as the transmit end may further send the service configuration parameters within the unit time period or in the unit data frame to the downstream forwarding device serving as the receive end. The downstream forwarding device may determine, based on the service configuration parameters, the transmission windows corresponding to each service by using the method same as that of the upstream forwarding device, in other words, determine transmission windows by which each service is carried. In this way, the downstream forwarding device may demultiplex the received service based on the determined transmission windows corresponding to each service, to restore each service. It can be learned that in this embodiment of this application, a mapping relationship between a service and transmission windows does not need to be stored in the upstream forwarding device, and the mapping relationship between the service and the transmission windows does not need to be transmitted between the upstream forwarding device and the downstream forwarding device. Correct demultiplexing can be implemented by transmitting only a small quantity of service configuration parameters, which has high storage efficiency and transmission efficiency.

Figure 14:
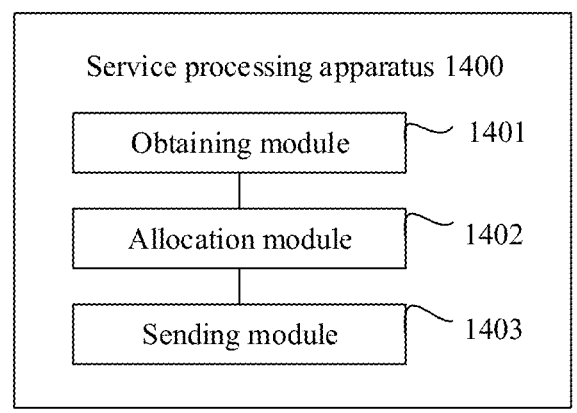
FIG. 14 is a schematic diagram of a structure of a service processing apparatus according to an embodiment of this application.

Refer to FIG. 14. An embodiment of the application provides a service processing apparatus 1400. The apparatus 1400 includes:

an obtaining module 1401, configured to perform step 301 in the foregoing embodiment;

an allocation module 1402, configured to perform step 302 in the foregoing embodiment; and a sending module 1403, configured to perform step 303 in the foregoing embodiment.

Optionally, the allocation module 1402 includes:

a determining submodule, configured to determine, based on a quantity of transmission windows required by each of n services, candidate service identifiers corresponding to each of k transmission resources, where the k transmission resources are obtained by dividing total transmission resources within a unit time period or in a unit data frame, the candidate service identifiers are service identifiers of services that expect to use the corresponding transmission resource, and k is not less than the largest quantity of transmission windows in quantities of transmission windows required by the n services; and an allocation submodule, configured to allocate corresponding transmission windows to each service based on the candidate service identifiers corresponding to each transmission resource.

Optionally, k is any value of the largest quantity of transmission windows, m, and $2^p$.

Optionally, the determining submodule is specifically configured to:

sequentially detect, based on the quantity of transmission windows required by each of the n services, whether each of the n services expects to use a first transmission resource, where the first transmission resource is any one of the k transmission resources; and if none of the n services expects to use the first transmission resource, determine that candidate service identifiers corresponding to the first transmission resource are empty; or if a service that expects to use the first transmission resource exists in the n services, use service identifiers of one or more services expecting to use the first transmission resource as candidate service identifiers of the first transmission resource.

Optionally, the allocation submodule is specifically configured to:

generate a service identifier buffer queue based on a sequence of the k transmission resources and a sequence of the services identified by the candidate service identifiers corresponding to each transmission resource; and when a total quantity of transmission windows required by then services is equal to m, sequentially allocate, based on a sequence of m transmission windows, the m transmission windows to the services identified by the service identifiers in the service identifier buffer queue; or when a total quantity of transmission windows required by the n services is less than m, sequentially allocate, based on a sequence of m transmission windows, a quantity of transmission windows in the m transmission windows that is equal to the total quantity of transmission windows required by the n services to the services identified by the service identifiers in the service identifier buffer queue.

Optionally, when the total quantity of transmission windows required by the n services is equal to m, the n services include one or more idle services.

Optionally, the sequence of the services identified by the candidate service identifiers corresponding to each transmission resource is a sequence of service numbers of the services in ascending order; or the sequence of the services identified by the candidate service identifiers corresponding to each transmission resource is a sequence of remainders corresponding to the services in descending order, and a remainder corresponding to each service is a remainder obtained by dividing a product of the quantity of transmission windows required by the service and a sequence number of the corresponding transmission resource in the k transmission resources by k.

Optionally, the allocation submodule is specifically configured to:

when the candidate service identifiers corresponding to the first transmission resource are determined, generate a service identifier buffer queue based on the candidate service identifiers corresponding to the first transmission resource;

sequentially allocate, starting from the first transmission window in current remaining transmission windows of the m transmission windows, corresponding transmission windows to a service identified by each service identifier in the service identifier buffer queue, and delete an allocated service identifier from the buffer queue; and correspondingly, the apparatus is further configured to:

when it is detected that the service identifier buffer queue is empty, use a second transmission resource as the first transmission resource, and re-perform a step of sequentially detecting, based on the quantity of transmission windows required by each of the n services, whether each of the n services expects to use the first transmission resource, where the second transmission resource is located after the first transmission resource and adjacent to the first transmission resource.

Optionally, the determining submodule is specifically configured to:

for the $i^{th}$ service in the n services, determine a product of a quantity of transmission windows required by the $i^{th}$ service and j, where j is a sequence number of the first transmission resource in the k transmission resources;

determine a remainder by dividing the product by k; and if the remainder is less than the quantity of transmission windows required by the $i^{th}$ service, determine that the $i^{th}$ service expects to use the first transmission resource.

Optionally, the determining submodule is specifically configured to:

for the $i^{th}$ service in the n services, determine a product of a quantity of transmission windows required by the $i^{th}$ service and $k-j+1$, where j is a sequence number of the first transmission resource in the k transmission resources;

determine a remainder by dividing the product by k; and if the remainder is less than the quantity of transmission windows required by the $i^{th}$ service, determine that the $i^{th}$ service expects to use the first transmission resource.

Optionally, the allocation module 1402 is specifically configured to:

allocate, from the m transmission windows, $C_1$ transmission windows to the first service in the n services based on a quantity $C_1$ of transmission windows required by the first service and m; and allocate, from remaining transmission windows in the m transmission windows, $C_i$ transmission windows to the $i^{th}$ service in the n services based on a quantity $C_i$ of transmission windows required by the $i^{th}$ service and m, where the remaining transmission windows are remaining transmission windows in the m transmission windows other than transmission windows allocated to the first i−1 services, and i is an integer greater than 1.

Optionally, the allocation module 1402 is specifically configured to:

assign i=1 and j=1, and determine, based on a quantity of transmission windows required by the $i^{th}$ service and m, whether the $i^{th}$ service expects to use the $h^{th}$ transmission window, where h is equal to j or h is equal to m−j+1; and if the $i^{th}$ service expects to use the $h^{th}$ transmission window, allocate the $h^{th}$ transmission window to the $i^{th}$ service; and assign i=1 and j=j+1, and return to a step of determining whether the $i^{th}$ service expects to use the $h^{th}$ transmission window until j=m; or if the $i^{th}$ service does not expect to use the $h^{th}$ transmission window, assign i=i+1, return to a step of determining whether the $i^{th}$ service expects to use the $h^{th}$ transmission window until i=n, and allocate the $h^{th}$ transmission window to the $n^{th}$ service; and assign i=1 and j=j+1, and return to the step of determining whether the $i^{th}$ service expects to use the $h^{th}$ transmission window.

Optionally, the apparatus 1400 is further configured to:

send service configuration parameters to a receiving device, so that the receiving device demultiplexes received multiplexed data based on the service configuration parameters to obtain service data of the n services, where the service configuration parameters include the quantity of transmission windows required by each of the n services.

In conclusion, in this embodiment of this application, a transmit end may obtain the quantity of transmission windows required by each of the n to-be-mapped services within the unit time period or in the unit data frame, where the unit time period or the unit data frame includes the m transmission windows. Then, the transmit end may allocate, from the m transmission windows, the corresponding transmission windows to each service based on the quantity of transmission windows required by each service; and multiplex, based on the transmission windows corresponding to each service, the service data of then services into data transmitted in one channel, and send the multiplexed data. It can be learned that in this embodiment of this application, the unit time period or the unit data frame may be divided into the m transmission windows, and then the corresponding transmission windows are allocated to each service to transmit the service. In this way, a plurality of services may be multiplexed within one time period or in one data frame for service transmission, thereby avoiding a waste of bandwidth resources in a related technology that occurs because the one time period or the one data frame can carry only one service.

It should be noted that when the service processing apparatus provided in the foregoing embodiments processes a service, division into the foregoing functional modules is merely an example for description. In actual application, the functions may be implemented by different functional modules as required. To be specific, an internal structure of the apparatus is divided into different functional modules to implement all or some of the functions described above. In addition, the service processing apparatus provided in the foregoing embodiment belongs to a same concept as the embodiment of the service processing method. For a specific implementation process of the service processing apparatus, refer to the method embodiment. Details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of the application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

It should be understood that "a plurality of" in this specification means two or more than two. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

The foregoing descriptions are merely embodiments of this application, but are not intended to limit this application. Any modification, equivalent replacement, or improvement made without departing from the principle of this application should fall within the protection scope of this application.

What is claimed is:

1. A service processing method, wherein the method comprises:
    obtaining a quantity of transmission windows corresponding to each of n services within a unit time period or in a unit data frame, wherein the unit time period or the unit data frame comprises m transmission windows, a total quantity of transmission windows corresponding to the n services is not greater than m, and both m and n are integers greater than 1;
    allocating, from the m transmission windows, corresponding transmission windows to each service based on the quantity of transmission windows corresponding to each of the n services;
    multiplexing, based on the transmission windows corresponding to each service, service data of the n services into multiplexed data transmitted in one channel; and
    sending the multiplexed data, wherein allocating, from the m transmission windows, corresponding transmission windows to each service based on the quantity of transmission windows corresponding to each of the n services comprises:
        determining, based on the quantity of transmission windows corresponding to each of the n services, candidate service identifiers corresponding to each of k transmission resources, wherein the k transmission resources are obtained by dividing total transmission resources within the unit time period or in the unit data frame, the candidate service identifiers are service identifiers of services that expect to use a corresponding transmission resource, and k is an integer greater than 1 and k is not less than the largest quantity of transmission windows in quantities of transmission windows corresponding to the n services; and
    allocating the corresponding transmission windows to each service based on the candidate service identifiers corresponding to each transmission resource, wherein allocating the corresponding transmission windows to each service based on the candidate service identifiers corresponding to each transmission resource comprises:
        generating a service identifier buffer queue based on a sequence of the k transmission resources and a sequence of the services identified by the candidate service identifiers corresponding to each transmission resource; and
        when the total quantity of transmission windows corresponding to the n services is equal to m, sequentially allocating, based on a sequence of the m transmission windows, the m transmission windows to the services identified by the candidate service identifiers in the service identifier buffer queue; or
        when the total quantity of transmission windows corresponding to the n services is less than m, sequentially allocating, based on a sequence of the m transmission windows, a quantity of transmission windows in the m transmission windows that is equal to the total quantity of transmission windows corresponding to the n services to the services identified by the candidate service identifiers in the service identifier buffer queue.

2. The method according to claim 1, wherein k is one of the largest quantity of transmission windows, m, or $2^P$, wherein p is an integer greater than 1.

3. The method according to claim 1, wherein determining, based on the quantity of transmission windows corresponding to each of the n services, the candidate service identifiers corresponding to each of k transmission resources comprises:
    sequentially detecting, based on the quantity of transmission windows corresponding to each of the n services, whether each of the n services expects to use a first transmission resource, wherein the first transmission resource is any one of the k transmission resources; and
    in response to determining that none of the n services expects to use the first transmission resource, determining that candidate service identifiers corresponding to the first transmission resource are empty; or
    in response to determining that a service that expects to use the first transmission resource exists in the n services, using service identifiers of one or more services expecting to use the first transmission resource as candidate service identifiers of the first transmission resource.

4. The method according to claim 3, wherein allocating the corresponding transmission windows to each service based on the candidate service identifiers corresponding to each transmission resource comprises:
    in response to determining the candidate service identifiers corresponding to the first transmission resource, generating a service identifier buffer queue based on the candidate service identifiers corresponding to the first transmission resource;

sequentially allocating, starting from a first transmission window in current remaining transmission windows of the m transmission windows, corresponding transmission windows to a service identified by each service identifier in the service identifier buffer queue; and deleting an allocated service identifier from the service identifier buffer queue; and wherein the method further comprises:

in response to determining that the service identifier buffer queue is empty, using a second transmission resource as the first transmission resource, and re-performing a step of sequentially detecting, based on the quantity of transmission windows corresponding to each of the n services, whether each of the n services expects to use a first transmission resource, wherein the second transmission resource is located after the first transmission resource and adjacent to the first transmission resource.

5. The method according to claim 3, wherein sequentially detecting, based on the quantity of transmission windows required by each of the n services, whether each of the n services expects to use the first transmission resource comprises:

for $i^{th}$ service in the n services, determining a product of a quantity of transmission windows corresponding to the $i^{th}$ service and j, wherein j is a sequence number of the first transmission resource in the k transmission resources;

determining a remainder by dividing the product by k; and in response to determining that the remainder is less than the quantity of transmission windows corresponding to the $i^{th}$ service, determining that the $i^{th}$ service expects to use the first transmission resource, wherein i and j are integers greater than 1.

6. The method according to claim 3, wherein sequentially detecting, based on the quantity of transmission windows corresponding to each of the n services, whether each of the n services expects to use the first transmission resource comprises:

for $i^{th}$ service in the n services, determining a product of a quantity of transmission windows corresponding to the $i^{th}$ service and k−j+1, wherein j is a sequence number of the first transmission resource in the k transmission resources;

determining a remainder by dividing the product by k; and in response to determining that the remainder is less than the quantity of transmission windows required by the $i^{th}$ service, determining that the $i^{th}$ service expects to use the first transmission resource.

7. The method according to claim 1, wherein when the total quantity of transmission windows corresponding to the n services is equal to m, the n services comprise one or more idle services.

8. The method according to claim 1, wherein:

the sequence of the services identified by the candidate service identifiers corresponding to each transmission resource is a sequence of service numbers of the services in ascending order; or the sequence of the services identified by the candidate service identifiers corresponding to each transmission resource is a sequence of remainders corresponding to the services in descending order, and a remainder corresponding to each service is a remainder obtained by dividing a product of the quantity of transmission windows corresponding to the service and a sequence number of the corresponding transmission resource in the k transmission resources by k.

9. The method according to claim 1, wherein allocating, from the m transmission windows, corresponding transmission windows to each service based on the quantity of transmission windows corresponding to each of the n services comprises:

allocating, from the m transmission windows, $C_1$ transmission windows to a first service in the n services based on a quantity $C_1$ of transmission windows corresponding to the first service and m; and allocating, from remaining transmission windows in the m transmission windows, $C_i$ transmission windows to $i^{th}$ service in the n services based on a quantity $C_i$ of transmission windows required by the $i^{th}$ service and m, wherein the remaining transmission windows are in the m transmission windows other than transmission windows allocated to first i−1 services, wherein $C_i$ and i are integers greater than 1.

10. The method according to claim 1, wherein allocating, from the m transmission windows, corresponding transmission windows to each service based on the quantity of transmission windows corresponding to each of the n services comprises:

assigning i=1 and j=1;

determining, based on a quantity of transmission windows corresponding to $i^{th}$ service and m, whether the $i^{th}$ service expects to use $h^{th}$ transmission window, wherein h is equal to j or h is equal to m−j+1, and h is an integers greater than 1; and in response to determining that the $i^{th}$ service expects to use the $h^{th}$ transmission window:

allocating the $h^{th}$ transmission window to the $i^{th}$ service; and assigning i=1 and j=j+1; and returning to a step of determining whether the $i^{th}$ service expects to use the $h^{th}$ transmission window until j=m; or in response to determining that the $i^{th}$ service does not expect to use the $h^{th}$ transmission window:

assigning i=i+1;

returning to a step of determining whether the $i^{th}$ service expects to use the $h^{th}$ transmission window until i=n;

allocating the $h^{th}$ transmission window to $n^{th}$ service;

assigning i=1 and j=j+1; and returning to the step of determining whether the $i^{th}$ service expects to use the $h^{th}$ transmission window.

11. The method according to claim 1, wherein the method further comprises:

sending service configuration parameters to a receiving device, wherein the receiving device demultiplexes the multiplexed data based on the service configuration parameters to obtain the service data of the n services, wherein the service configuration parameters comprise the quantity of transmission windows corresponding to each of the n services.

12. A service processing apparatus, comprising:

one or more processors; and a non-transitory computer-readable memory storing a program to be executed by the one or more processors, the program including instructions that, when executed by the one or more processors, cause the apparatus to:

obtain a quantity of transmission windows corresponding to each of n services within a unit time period or in a unit data frame, wherein the unit time period or the unit data frame comprises m transmission windows, a total quantity of transmission windows corresponding to the n services is not greater than m, and both m and n are integers greater than 1;

allocate, from the m transmission windows, corresponding transmission windows to each service based on the quantity of transmission windows corresponding to each of the n services;

multiplex, based on the transmission windows corresponding to each service, service data of the n services into multiplexed data transmitted in one channel; and send the multiplexed data, wherein allocating, from the m transmission windows, corresponding transmission windows to each service based on the quantity of transmission windows corresponding to each of the n services comprises:

determining, based on the quantity of transmission windows corresponding to each of the n services, candidate service identifiers corresponding to each of k transmission resources, wherein the k transmission resources are obtained by dividing total transmission resources within the unit time period or in the unit data frame, the candidate service identifiers are service identifiers of services that expect to use a corresponding transmission resource, k is an integer greater than 1 and k is not less than the largest quantity of transmission windows in quantities of transmission windows corresponding to the n services; and allocating the corresponding transmission windows to each service based on the candidate service identifiers corresponding to each transmission resource, wherein allocate the corresponding transmission windows to each service based on the candidate service identifiers corresponding to each transmission resource comprises:

generating a service identifier buffer queue based on a sequence of the k transmission resources and a sequence of the services identified by the candidate service identifiers corresponding to each transmission resource; and when the total quantity of transmission windows corresponding to the n services is equal to m, sequentially allocating, based on a sequence of the m transmission windows, the m transmission windows to the services identified by the candidate service identifiers in the service identifier buffer queue; or when the total quantity of transmission windows corresponding to the n services is less than m, sequentially allocating, based on a sequence of the m transmission windows, a quantity of transmission windows in the m transmission windows that is equal to the total quantity of transmission windows corresponding to the n services to the services identified by the candidate service identifiers in the service identifier buffer queue.

13. The apparatus according to claim 12, wherein k is one of the largest quantity of transmission windows, m, or $2^p$, and k is an integer greater than 1.

14. The apparatus according to claim 12, wherein the program further comprises instructions that, when executed by the one or more processors, cause the apparatus to:

sequentially detect, based on the quantity of transmission windows corresponding to each of the n services, whether each of the n services expects to use a first transmission resource, wherein the first transmission resource is any one of the k transmission resources; and in response to determining that none of the n services expects to use the first transmission resource, determine that candidate service identifiers corresponding to the first transmission resource are empty; or in response to determining that a service that expects to use the first transmission resource exists in the n services, use service identifiers of one or more services expecting to use the first transmission resource as candidate service identifiers of the first transmission resource.

15. The apparatus according to claim 14, wherein allocating the corresponding transmission windows to each service based on the candidate service identifiers corresponding to each transmission resource comprises:

in response to determining the candidate service identifiers corresponding to the first transmission resource, generating a service identifier buffer queue based on the candidate service identifiers corresponding to the first transmission resource;

sequentially allocating, starting from a first transmission window in current remaining transmission windows of the m transmission windows, corresponding transmission windows to a service identified by each service identifier in the service identifier buffer queue; and deleting an allocated service identifier from the service identifier buffer queue; and wherein the program including instructions that, when executed by the one or more processors, cause the apparatus to:

in response to determining that the service identifier buffer queue is empty, use a second transmission resource as the first transmission resource, and re-performing a step of sequentially detecting, based on the quantity of transmission windows corresponding to each of the n services, whether each of the n services expects to use a first transmission resource, wherein the second transmission resource is located after the first transmission resource and adjacent to the first transmission resource.

16. The apparatus according to claim 14, wherein sequentially detecting, based on the quantity of transmission windows required by each of the n services, whether each of the n services expects to use the first transmission resource comprises:

for $i^{th}$ service in the n services, determining a product of a quantity of transmission windows corresponding to the $i^{th}$ service and j, wherein j is a sequence number of the first transmission resource in the k transmission resources;

determining a remainder by dividing the product by k; and in response to determining that the remainder is less than the quantity of transmission windows corresponding to the $i^{th}$ service, determining that the $i^{th}$ service expects to use the first transmission resource, wherein i and j are integers greater than 1.

17. The apparatus according to claim 14, wherein sequentially detecting, based on the quantity of transmission windows corresponding to each of the n services, whether each of the n services expects to use the first transmission resource comprises:

for $i^{th}$ service in the n services, determining a product of a quantity of transmission windows corresponding to the $i^{th}$ service and k−j+1, wherein j is a sequence number of the first transmission resource in the k transmission resources;

determining a remainder by dividing the product by k; and in response to determining that the remainder is less than the quantity of transmission windows required by the $i^{th}$ service, determining that the $i^{th}$ service expects to use the first transmission resource.

18. The apparatus according to claim 12, wherein when the total quantity of transmission windows corresponding to the n services is equal to m, the n services comprise one or more idle services.

19. The apparatus according to claim 12, wherein:
the sequence of the services identified by the candidate service identifiers corresponding to each transmission resource is a sequence of service numbers of the services in ascending order; or
the sequence of the services identified by the candidate service identifiers corresponding to each transmission resource is a sequence of remainders corresponding to the services in descending order, and a remainder corresponding to each service is a remainder obtained by dividing a product of the quantity of transmission windows corresponding to the service and a sequence number of the corresponding transmission resource in the k transmission resources by k.

20. The apparatus according to claim 12, wherein allocating, from the m transmission windows, corresponding transmission windows to each service based on the quantity of transmission windows corresponding to each of the n services comprises:
allocating, from the m transmission windows, $C_1$ transmission windows to a first service in the n services based on a quantity $C_1$ of transmission windows corresponding to the first service and m; and
allocating, from remaining transmission windows in the m transmission windows, $C_i$ transmission windows to $i^{th}$ service in the n services based on a quantity $C_i$ of transmission windows required by the $i^{th}$ service and m, wherein the remaining transmission windows are in the m transmission windows other than transmission windows allocated to first i−1 services, wherein $C_i$ and i are integers greater than 1.

* * * * *